US011711135B1

(12) United States Patent
Gajjar et al.

(10) Patent No.: US 11,711,135 B1
(45) Date of Patent: Jul. 25, 2023

(54) NAUTICAL GROUND STATION

(71) Applicants: Nehal Gajjar, San Francisco, CA (US); Alexander Jacques Fleming, San Francisco, CA (US)

(72) Inventors: Nehal Gajjar, San Francisco, CA (US); Alexander Jacques Fleming, San Francisco, CA (US)

(*) Notice: Subject to any disclaimer, the term of this patent is extended or adjusted under 35 U.S.C. 154(b) by 0 days.

(21) Appl. No.: 17/118,513

(22) Filed: Dec. 10, 2020

Related U.S. Application Data

(60) Provisional application No. 62/945,892, filed on Dec. 10, 2019.

(51) Int. Cl.
*H04B 7/155* (2006.01)
*H04B 7/185* (2006.01)
*H04W 64/00* (2009.01)

(52) U.S. Cl.
CPC ......... *H04B 7/155* (2013.01); *H04B 7/18513* (2013.01); *H04W 64/003* (2013.01)

(58) Field of Classification Search
CPC ............. B64C 39/024; G01S 17/931; G01S 13/931; G01S 17/89; G01S 19/42; G01S 13/862; G01S 13/865; G01S 13/867; G01S 15/32; G01S 15/325; G01S 15/586; G01S 15/89; G01S 15/8902; G01S 7/4026; G01S 7/4814; G01S 7/4972; G01S 7/52003; G01S 13/06; G01S 13/32; G05D 1/0257; B64F 1/005; H04L 67/12; G06F 16/29; G07C 5/008; G07C 5/085; H04K 2203/22; H04K 3/65; H04K 3/224
See application file for complete search history.

(56) References Cited

U.S. PATENT DOCUMENTS

| 10,650,621 | B1* | 5/2020 | King .................. H04L 67/10 |
| 2002/0090868 | A1* | 7/2002 | Schmitman ......... H01M 8/0656 |
| | | | 440/113 |
| 2005/0215267 | A1* | 9/2005 | Cartmell ............. G08G 1/0962 |
| | | | 455/456.1 |
| 2018/0096541 | A1* | 4/2018 | O'Brien ............. G06K 9/00637 |

* cited by examiner

*Primary Examiner* — Khalid W Shaheed
(74) *Attorney, Agent, or Firm* — Andrew C. Aitken

(57) ABSTRACT

An unmanned mobile communication station is adapted for location in a marine environment and includes a platform adapted for flotation or is semi-submersible, a communication node for sending and receiving wireless signals, a power system for energizing said communication node, a data center, at least one sensor for detecting the geolocation of the platform; and a processor for receiving signals from said sensors and controlling communication to and from communication nodes wherein embodiments include both autonomous and remote controlled navigation and propulsion systems.

8 Claims, 17 Drawing Sheets

Fig. 2 (UXV with tethered System Below)

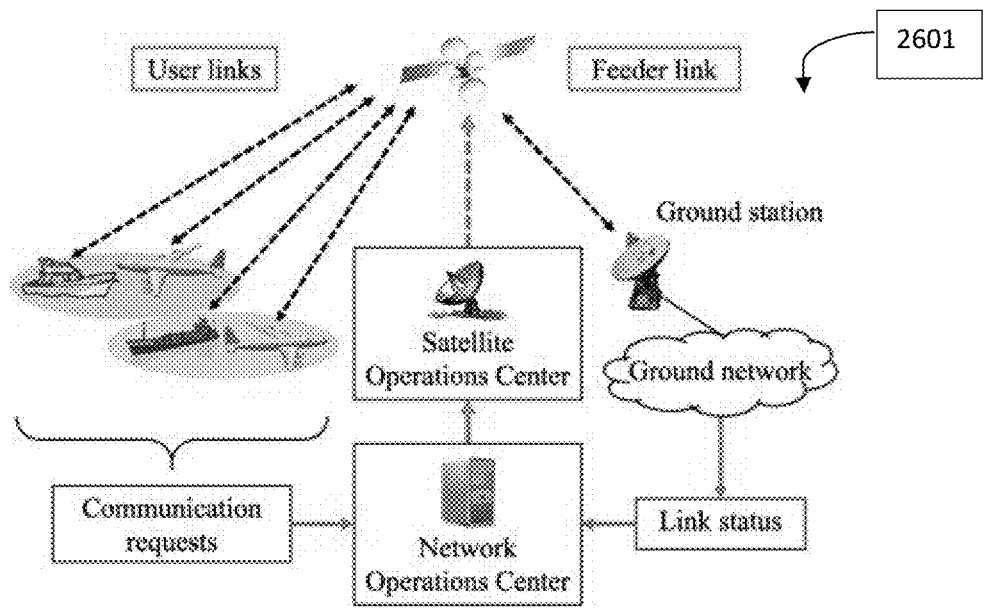
Fig. 26 (Example of Network)
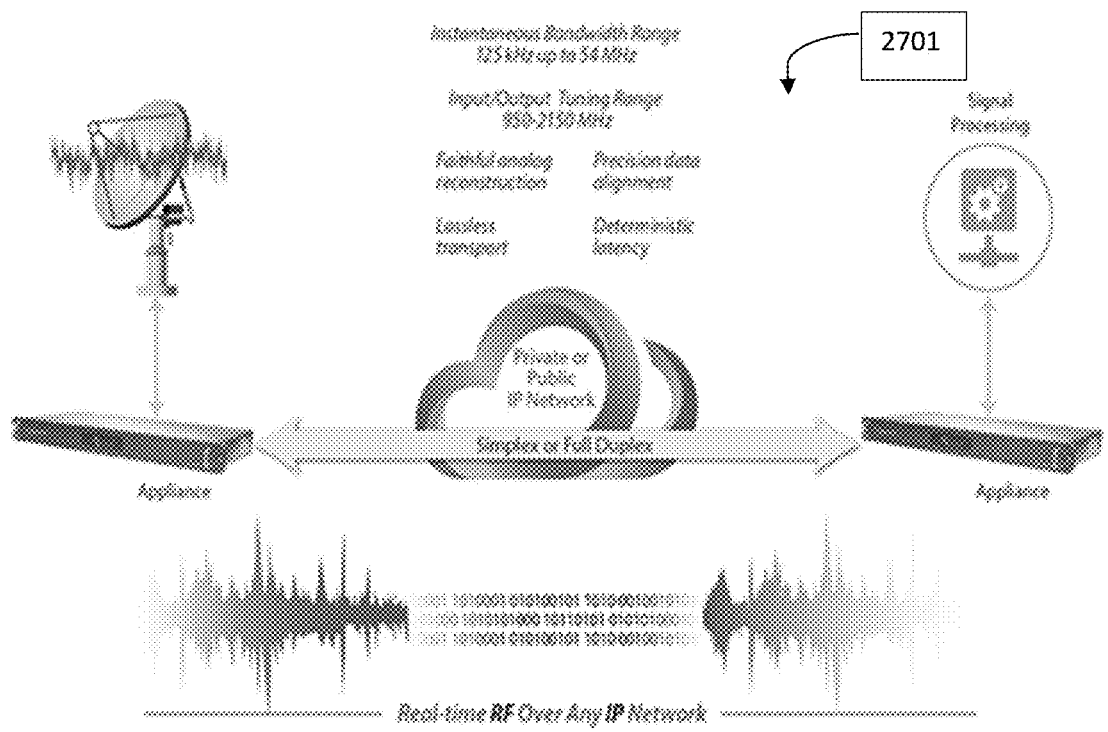
Fig. 27 (Example of Ground Segment Network)

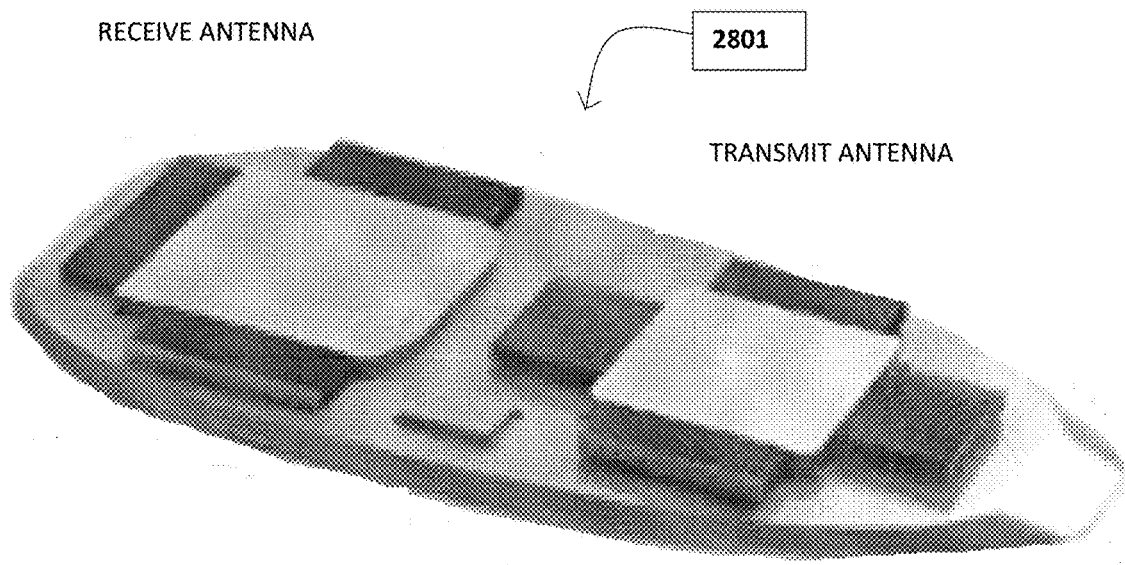
Fig. 28 (Example of Steerable Antenna)
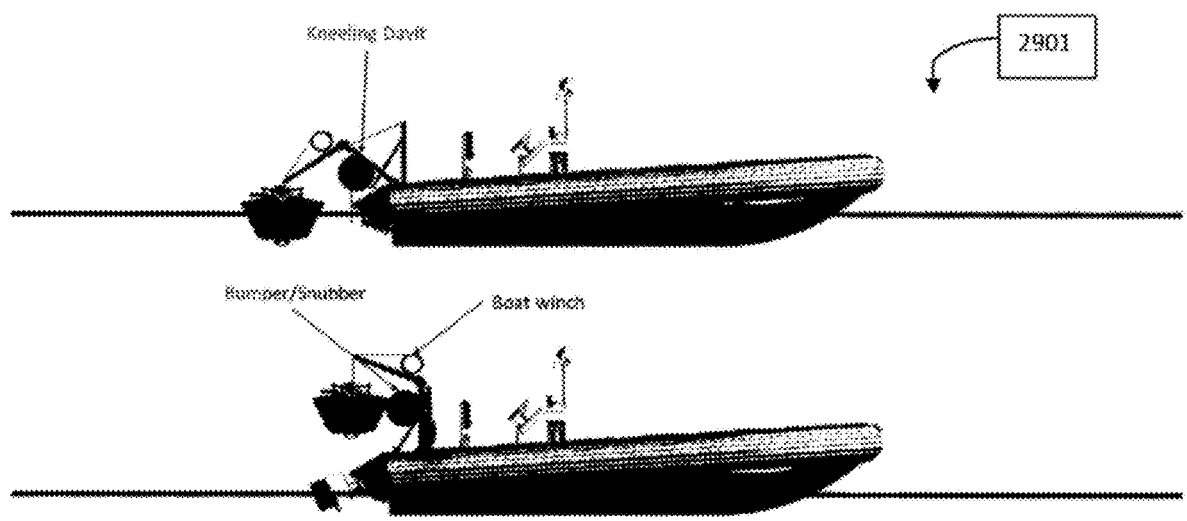
Fig. 29

NAUTICAL GROUND STATION

RELATED APPLICATIONS

The Applicants claim the benefit of the filing date of U.S. Application No. 62/945,892.

BACKGROUND OF THE INVENTION

Design considerations for low earth orbit ("LEO") systems are especially challenging because of their high orbital speed, typically making a full orbit every 90-110 minutes. Because of this, a ground communication station serving a LEO satellite can only communicate with it during the brief windows of time when the satellite is above the station's horizon plane. This means that for multiple periods throughout the day, that station has no contact with the satellite. This applies to other space satellites too. The earth is covered approximately by 71% water where currently no ground stations are present.

SUMMARY OF THE INVENTION

The present invention is generally directed at floating or semi-submersible open ocean communication referred herein as Nautical Ground Station (NGS). The NGS as described herein are mobile floating or semi-submersible data center that is connected terrestrially through a mobile ad hoc network with satellite communication backhaul. Several NGS(s) can be connected under a self-healing mesh network able to maintain connection globally with LEO, MEO and GEO satellites and other disparate assets or sensors whether airborne, marine or subsea.

A data center, as referred to herein is a facility that centralizes an organization's shared IT operations and equipment for the purposes of storing, processing, and disseminating data and applications. Because they house an organization's most critical and proprietary assets, data centers are vital to the continuity of daily operations.

Ground stations consist largely of an antenna that physically communicates data from orbiting spacecraft and processes it into actionable reports for satellite and human spaceflight operators. A single ground station can support multiple spacecraft, repositioning to communicate with each one.

A plurality of NGSs can act in coordinated swarm under a self-healing mesh network. Swarms are defined as multiple unmanned platforms and/or weapons, connected by communication links, deployed to accomplish a shared objective, with the platforms and/or weapons autonomously altering their behavior based on communication with one another. In embodiments, the NGS have a plurality of servers contained onboard as a mobile floating or semi-submersible data center to process data at the edge. In general, edge computing is a distributed computing paradigm that brings computation and data storage closer to the location where it is needed, to improve response times and save bandwidth. By processing at the edge or edge compute data can be reduced near the source of interest reducing latency and response times in an evolving battlefield, natural disaster, commercial interest or scientific observation. 1 U is a standard unit of measure defined as 1¾ inches (4.4 cm) height. It is most frequently used as a 1 U measurement of the overall width of 19-inch server (such as a HP blade or data storage device) having an exterior width 24-inch rack frames, as well as the height of equipment that mounts in these frames, whereby the height of the frame or equipment is expressed as multiples of rack units. Therefor a N#U would be N times 1 U. Through edge processing the NGS can send data to users in a maritime or austere environment with low latency or back to operating centers not in direct RF link faster by increased communication with assets or sensors via global coverage and edge processing.

NGS data center servers can be cooled using the surrounding water in a closed loop heat exchanger whereby the external shell would have keel coolers or cooling tubes linked to a radiator internal to a watertight compartment with the NGS. Other embodiments use a liquid-liquid heat exchange whereby phase change reduced pressure nucleate boiling is achieved to quench heat sources on processing boards—CPUs or a dielectric non phase change fluid is circulated to an external heat exchanger. While the use of raw seawater is a possibility, it is discouraged given the challenges of bio fouling, corrosion and impact on marine life, such as fish larvae.

As a communication gateway the NGS as described can relay information from subsea assets such as Unmanned Underwater Vehicles ("UUVs"), Remotely Operated Vehicles or Manned Subsea Operations via optical, acoustic or tethered means backhauled through its mesh network work and SATCOM capability and other surface assets and vehicles. In embodiments, the NGS is powered using batteries or power generating devices. In further embodiments, power is supplemented using energy harvesting from marine hydrokinetic resources, wind and solar which provide propulsion and store energy via battery or produce hydrogen via an electrolyzer and power the device via a fuel cell or use of a Solid Oxide Fuel Cell-SOFC.

One embodiment of the invention is for the NGS to act as a deep ocean observation platform ("DOSP") and a recharging station. In this embodiment, the DOSP autonomous system provides improved spatial and temporal resolution of the deep ocean as a stand-off command and control asset for secondary subsea autonomous systems that include but are not limited to UUVs, autonomous underwater vehicles ("AUVs"), sensors and remotely operated vehicles ("ROVs"). These secondary systems use the DOSP as a means to download data and recharge through a moon pool on the DOSP or tethered system with the platform having an onboard winch to decouple from the surface wave motion in docking. A moon pool is an open area in the bottom surface of a marine vehicle where another subsea system could come up to it, connect via this space to the DOSP platform for recharging, perform repairs, swap payloads, download and transmit data. This approach enables a persistent observation over decommissioned offshore platforms for health monitoring and surveying or areas of scientific or commercial interest. The DOSP can also extend the range of AUVs on long endurance missions by recharging and exfilling the data and relaying new mission sets based on the edge processed data. By linking sensors on the DOSP and secondary systems, sensor fusion between different phenomenologys can occur giving greater insight to the areas being mapped. By coordination between several DOSP or secondary system a broad area search and mapping can be enabled.

Another embodiment of the invention enables a dual use military application capable of ISR, EW and MCM. The NGS can function as an Unmanned multi-domain Vehicle ("UxV"). As a UxV, it can be designed at the lowest SWAP+C (Size Weight Power and Cost) for a small footprint with low vulnerability (RCS, Infrared, Acoustic, Electro Magnetic) as an autonomous system enabling it to operate covertly. The UxV deploys a tethered drone at a height above the influence of the fresnel zone to improve ship to ship communication as a communication relay. A fresnel zone is one of a series of confocal prolate ellipsoidal regions of space between and around a transmitter and a receiver reducing link budgets. By the user of several UxVs under a mesh network, the system extends the ship to ship communication significantly including over the horizon. By operating close to shore the UxV can extend the range and link budgets of Unmanned Aerial Vehicle through the mesh network or SATCOM backhaul to a tactical operating center not in direct RF link As an ISR platform with EO/IR cameras or LIDAR on the tethered drone it can provide a higher vantage point and range than being on the UxV ship itself at the waterline. The UxV also provides hydrography and bathymetry data as well as other ocean observable variables that can be processed locally on the plurality of servers on board the system and sent to an ATAK device via the mesh network to give situational awareness to forward operators. By connecting several UxVs in a swarm, the system provides for redundancy in a mesh network whereby the network can selfheal in a degraded environment if any node is lost as opposed to the loss of a single exquisite sensor. The UxV has a broad range of high bandwidth SATCOM frequencies (X,Ku,Ka,) as well as mesh network including (C-S-L, Link 16).

As an EW platform the UxV is able to soak the area for threats act as a reference emitter and geo location device and in some instances act as a decoy. As a MCM platform the UxV is able to identify threats through an integrated sonar (Side Scan, MBES, MPES, Bathymetry and Synthetic Aperture Sonar) or stand-off C2 asset exfilling data from a secondary asset such as a tethered/towed system like a towfish, ROV or communicate optically/acoustically to a AUV using a Sonar system. An object towed behind a vessel in the water, carrying sonar equipment is called a towfish.

Another embodiment is directed to a mission persistent platform by use of energy harvesting from marine hydrokinetic sources such as wave, ocean current, and ocean thermal. In other embodiments energy is harvested from wind and solar or hybrid of multiple sources of power generation. In a contemplated embodiment, a conventionally powered NGS, DOSP or UxV is modified in accordance with these teaching to be a mission persistent system capable of ocean deployment. Harvested energy is used to propel the vehicle platform, and provide power to the platform and subsystem during and between mission sets. In an embodiment the system is configured in a trimaran configuration whereby outer pontoons react against the center hull from wave action and produce power for energy storage or subsystems. Excess energy is stored in batteries for later use in a duty cycle or be electrolyzed into hydrogen or oxygen to be stored in the pontoons for later use in a fuel cell. Similarly, solar power is used to produce electricity. An embodiment of the system is propelled using wind power derived from Flettner rotors, conventional sails or flexible sail structures on the multi hull pontoons or central hull and combinations thereof. A conventional propellor is used to propel the vehicle using the stored energy or harvest energy as a regenerative system when underway using wave energy in heave or surge or wind power. While under wind power a regenerative propellor produces energy for later storage in batteries or fuel cell energy storage. IN further embodiments, the propelled device uses hydrofoils to lift the system out of the water to reduce drag and have the foils articulate in heave or surge to propel it forward. By harvesting energy in this manner the NGS, DOSP and UxV has a mission persistent endurance to act as a communication relay, edge processing semi-submersible data center, mesh network, sensor and recharging asset.

BRIEF DESCRIPTION OF THE DRAWINGS

FIG. 26 is a depiction of network using a ground station.

FIG. 27 depicts a Ground Segment Network using Real-time RF over any IP also called ROIP FIG. 28 is an example of a Steerable Antenna to receive and transmit RF and other spectrum signals FIG. 29 depicts launch and recovery features of UxV.

DETAILED DESCRIPTION

The NGS has the following distinct operational advantages over status quo terrestrial systems: Frequency allocation: RF and optical regulatory hurdles with Federal Communications Commission (FCC) or International Telecommunication Union (ITU) are averted allowing rapid deployment. FCC is the supreme regulatory agency in the USA on every communications issue. ITU is a specialized agency of the United Nations responsible for all matters related to information and communication technologies.

Spectrum Interference is ameliorated as it is over water expanding frequency spectra options for stakeholders. The system does not require zoning permitting. The NGS can be deployed in international waters and does require permits to place as terrestrial stakeholders. The system can be rapid deployed by air drop, deployed from a ship, drifting or self-propulsion to target site. The system has the ability to hold position as well as mission persistent self-propulsion to drive to a target location of interest. There is mission persistent ISR. By using Marine Hydrokinetic—MHK (wave/ocean current) power the NGS has infinite mission persistence and does not require logistics to supply fuel or batteries to operate. Embodiments of the system have a reduced vulnerability signature, semi-submersion or submerged capability via ballast. Other embodiments have a small surface presence and a reduced IR or RCS signature.

The system can also function as a recharging station. Larger NGS could be used to recharge Unmanned Underwater, surface and Air Vehicle assets. Embodiments of the system use a multi domain data relay. Such data relay or communication gateway are used for both manned and unmanned underwater and surface vehicle assets to space. A sensor fusion feature may be employed using smaller NGS sensor floats that increase maritime capability, coverage area, and can overwhelms hostile forces. The system has a multi mission capability with interchangeable modular sections that are hot swappable and identified by the autopilot. Contemplated embodiments include UUV communication (underwater Acoustic Modem) or USV to Satellite Data relay. The system can also function as a launch platform/recharge station/data relay for a UUV/UAV. Embodiments of the system allows for edge compute as an independent networked node. Additional feature of contemplated embodiments include: (1) Underwater Data Center capability to apply ML/AI techniques for Multi-Sensor and target tracking; (2) Hub and spoke model with central NGS node to process data from disparate networked sensor floats and apply ML/AI, and (3) a networked system using parallel processing edge compute ability to organize floats to overwhelm enemy defense.

Figure 1:
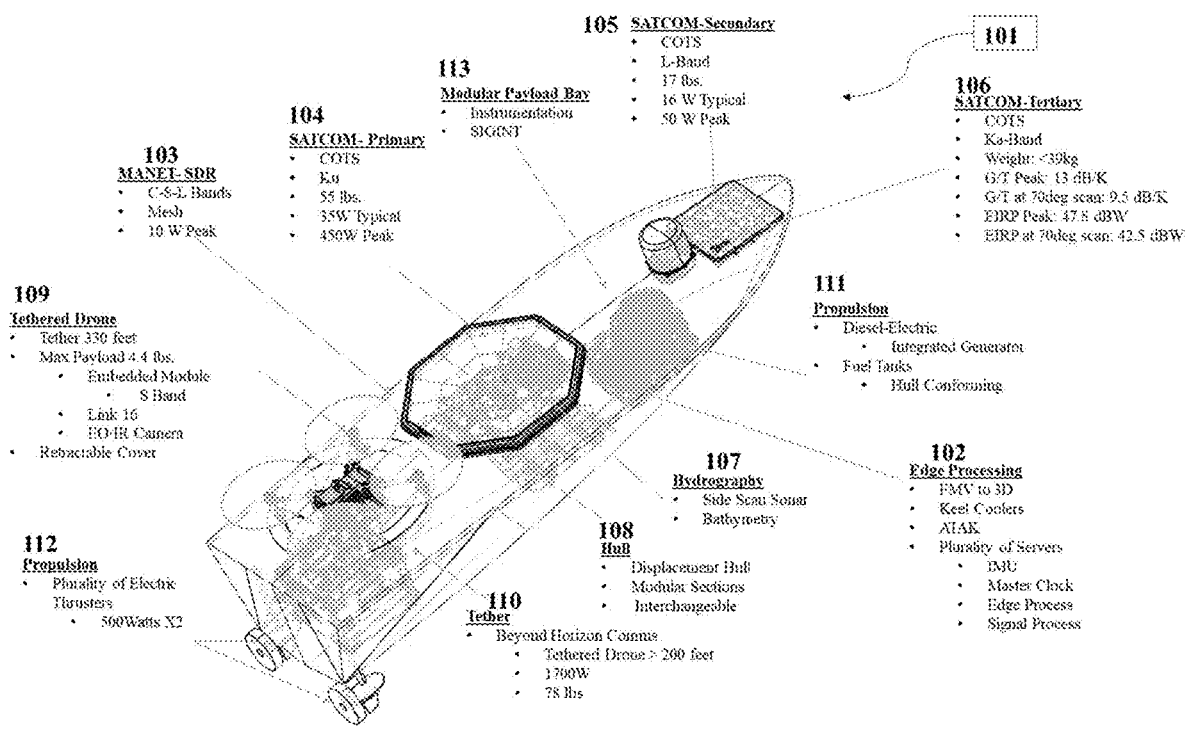
FIG. 1 is a perspective view of a conventionally powered UxV's general arrangement.

Now referring to FIG. 1, the capabilities of a typical ground station according to the invention shown in FIG. 1 are (1) an RF subsystem, a ground system needs an antenna and associated electronics for acquisition, tracking, and modulation/demodulation of a spacecraft's RF command, telemetry, and mission data links. The antenna must be properly sized based on the link budget calculations and have the appropriate physical tracking abilities for the satellites orbit regime. For low earth orbits (LEO) operations, the antenna is smaller but has greater physical requirements for tracking rapidly changing azimuths and elevations due to the high dynamics of a LEO orbit. For geostationary earth orbits (GEO) operations, a larger fixed array is used to provide the necessary gain to close the link. In the end, the overall goal of the RF subsystem is to convert baseband bits of data into RF waveforms and vice versa to transfer data between the ground system and space systems.

The processing subsystem carries out the baseband processing function. In this subsystem, the bits of data from the RF subsystem (in the case of telemetry) or the bits of data from the command and control subsystem (in the case of commanding) are processed and formatted for use for either transmission by the RF system or consumption by the C2 system. Baseband processing is carried out using standards such as those proposed by the Consultative Committee for Space Data Systems (CCSDS) that enforce a particular framing paradigm and error corrections schemes that allow industry to make common use products for these systems.

Figure 18:
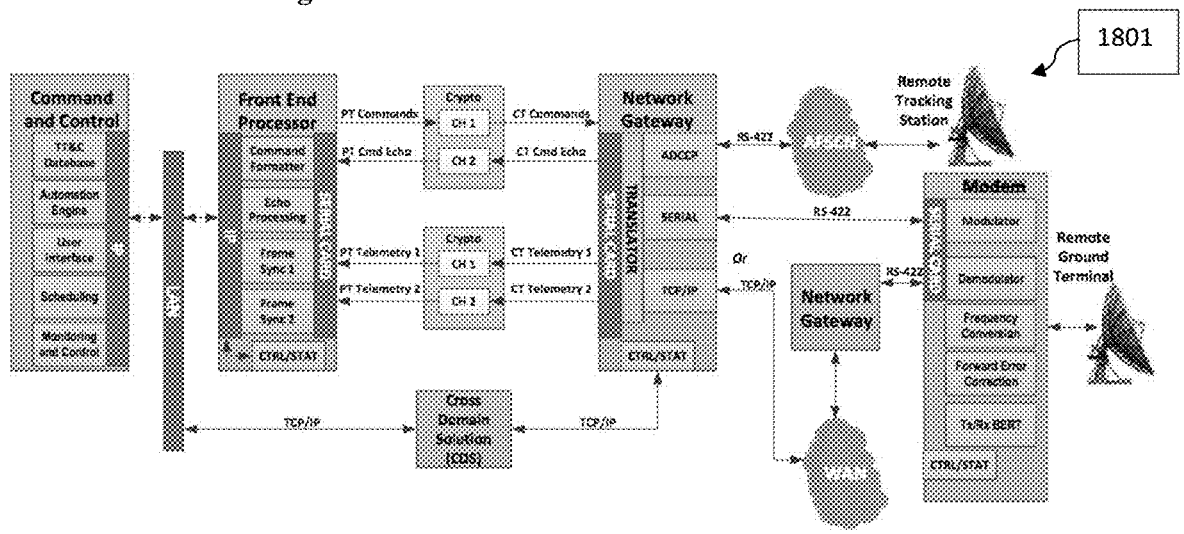
FIG. 18: Example of a system block diagram of a ground station showing in detail.
Figure 19:
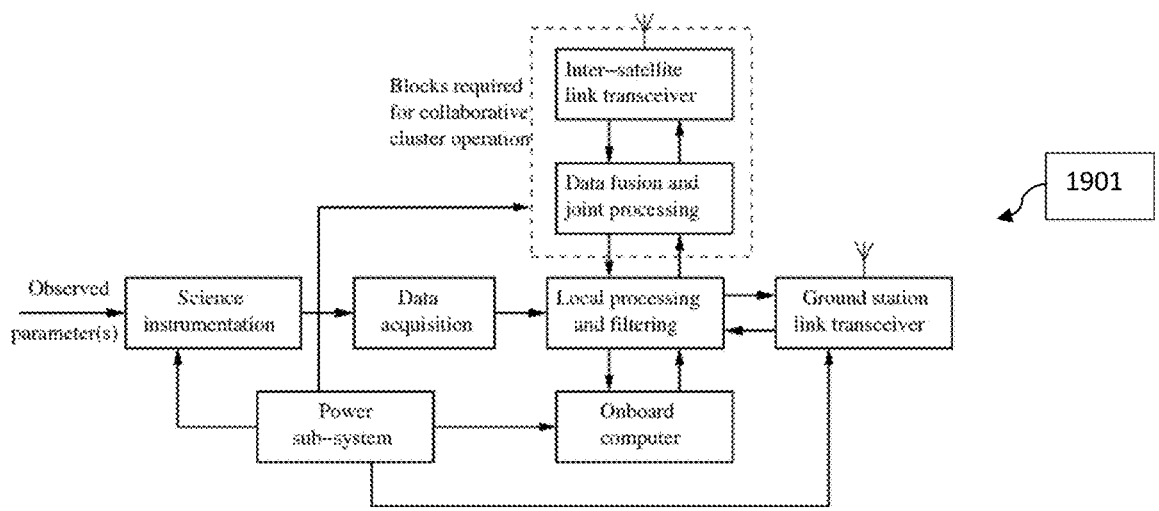
FIG. 19: Example of another system block diagram a ground station and its subsystems.
Figure 20:
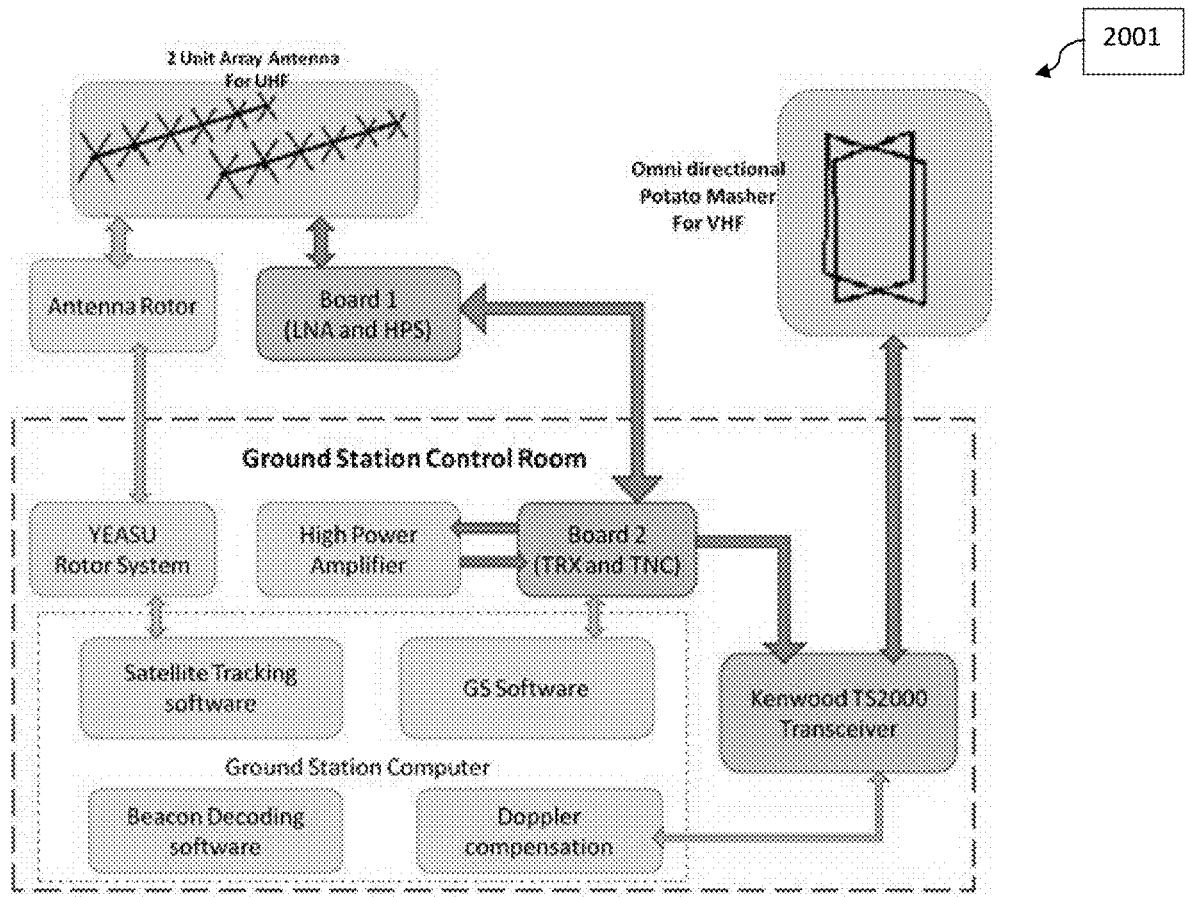
FIG. 20: Example of another ground station and its sub-components.
Figure 21:
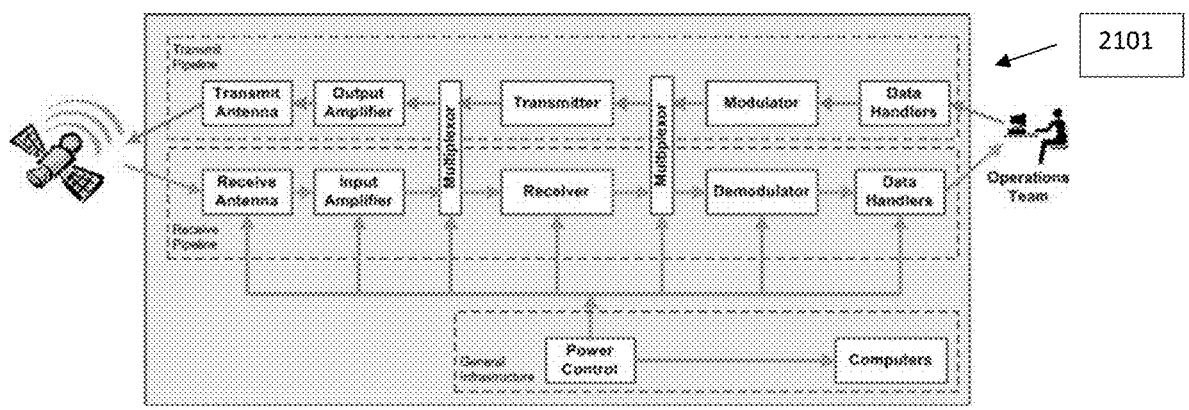
FIG. 21: Example of a ground station with a block diagram of the system.
Figure 22:
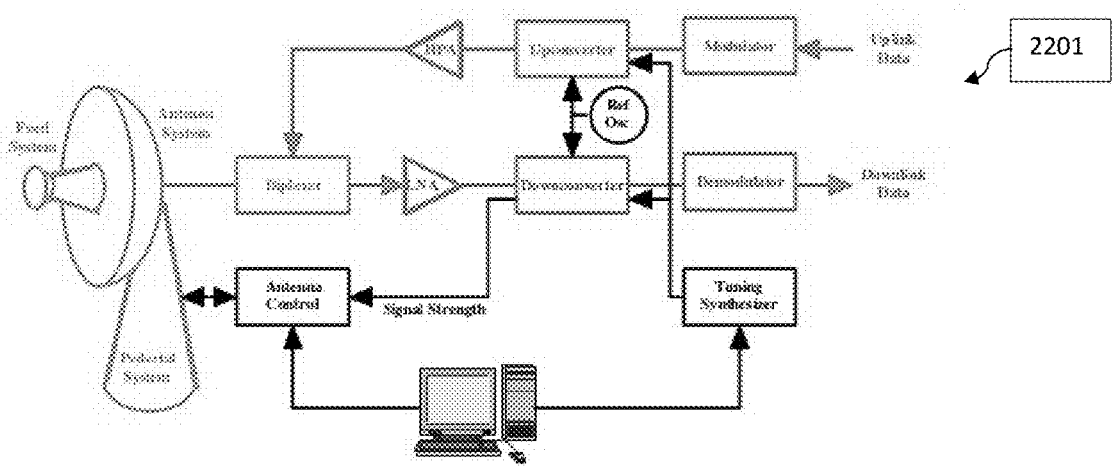
FIG. 22: Example of a ground station.

The Command and Control (C2) subsystem is where the processed streams of bits have been formatted into operator understandable telemetry health and status, ready for display at an operator's console. Likewise, commands can be issued from the C2 system either automatically or via operator to manage the spacecraft while on orbit. Certain stations have crew at these stations to send radio signals to the satellite (uplink), receive data transmissions from the satellite (downlink), and in some cases, serve as command and control centers for the satellite network. Examples are shown in FIGS. 18 to 20.

Marine systems: Marine systems include but not limited to variable ballast tanks and heave plate, bio fouling treatment, corrosion control, hoses. In the embodiments the marine systems include mooring and/or grid interconnect, vulnerability minimization.

Sensors: sensor is a device that is used to measure property such as pressure, position, temperature, acceleration and respond with feedback. IN different embodiment sensors may include but not limited to acoustic, electromagnetic (RF, optical or other), sonar, thermal, chemical, orientation, distance, speed, time of flight, laser altimeter, LiDAR, Synthetic Aperture Radar, radar, ranging, scatterometer, cameras, beacons, sounder, hyperspectral radiometer, radiometer, imaging radiometer, spectrometer, spectroradiometer, interferometer, bolometers, hydrophones, accelerometers, synthetic aperture sonar etc. With the computing capacity onboard a sensor fusion processing is also an option.

Ground Segment(GSg): A ground segment consists of all the ground-based elements of a spacecraft system used by operators and support personnel, as opposed to the space segment and user segment. The ground segment enables management of a spacecraft, and distribution of payload data and telemetry among interested parties on the ground. The primary elements of a ground segment are: (a) Ground (or Earth) stations, which provide radio interfaces with spacecraft; (b) Mission control (or operations) centers, from which spacecraft are managed. (c) Ground networks, which connect the other ground elements to one another, (d) Remote terminals, used by support personnel, (e) Spacecraft integration and test facilities, (f) Launch facilities. These elements are present in nearly all space missions, whether commercial, military, or scientific. They may be located together or separated geographically, and they may be operated by different parties. Some elements may support multiple spacecraft simultaneously.

Datacenter: Data centers are not a single thing, but rather, a conglomeration of elements including combination all manner of IT equipment, but not limited to servers, storage subsystems, networking switches, routers and firewalls, as well as the cabling and physical racks used to organize and interconnect the IT equipment. A data center may also contain an adequate infrastructure, such as power distribution and supplemental power subsystems, including electrical switching; uninterruptable power supplies; backup generators, ventilation, cooling systems, network carrier (telco) connectivity and so on; All of this demands a physical container with security as well as infrastructure and equipment. Datacenters can be located in water, land, air or space. It may be inside a pressure vessel with plurality of sensors/IMU, UUV and UAV/UAS recharging, vulnerability minimization and cooling circuit.

Computing Technologies: Technologies for data processing and computing including but not limited to PCs, servers, edge compute, virtualization technologies (e.g. Hypervisor) open source software, TCP/IP protocols, Object Monitoring Groups (GEMS), XML Telemetric and Command Exchange (XTCE) standards, algorithms, cryptography, security protocols and firewalls, blockchain technologies, artificial intelligence and machine learning.

Figure 23:
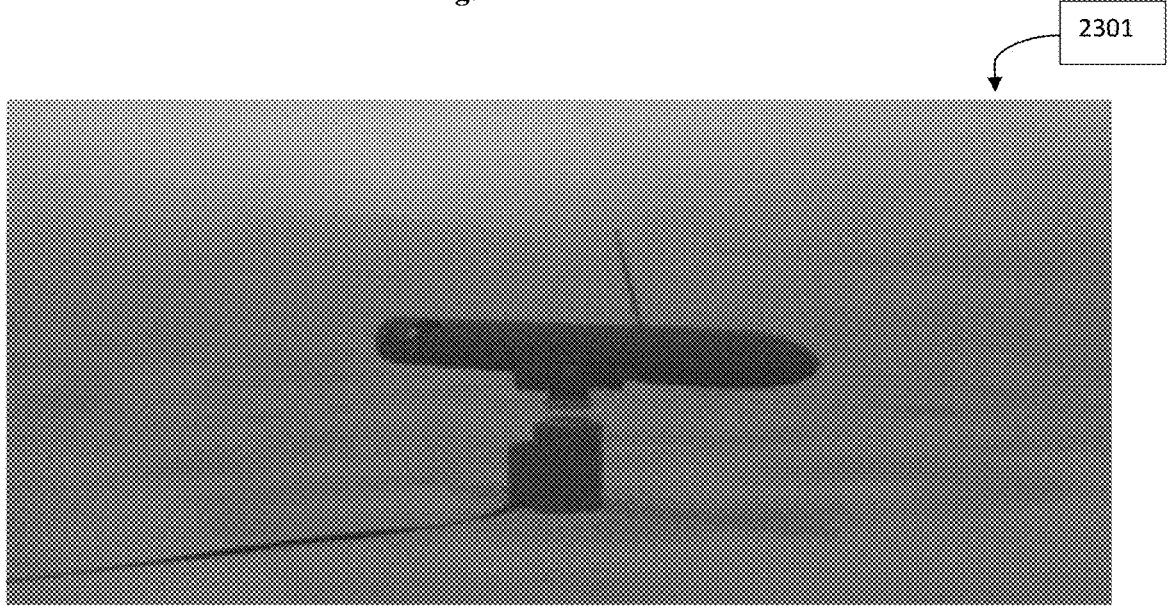
FIG. 23: Example of a vehicle (a UUV here) coming up to get recharged.
Figure 24:
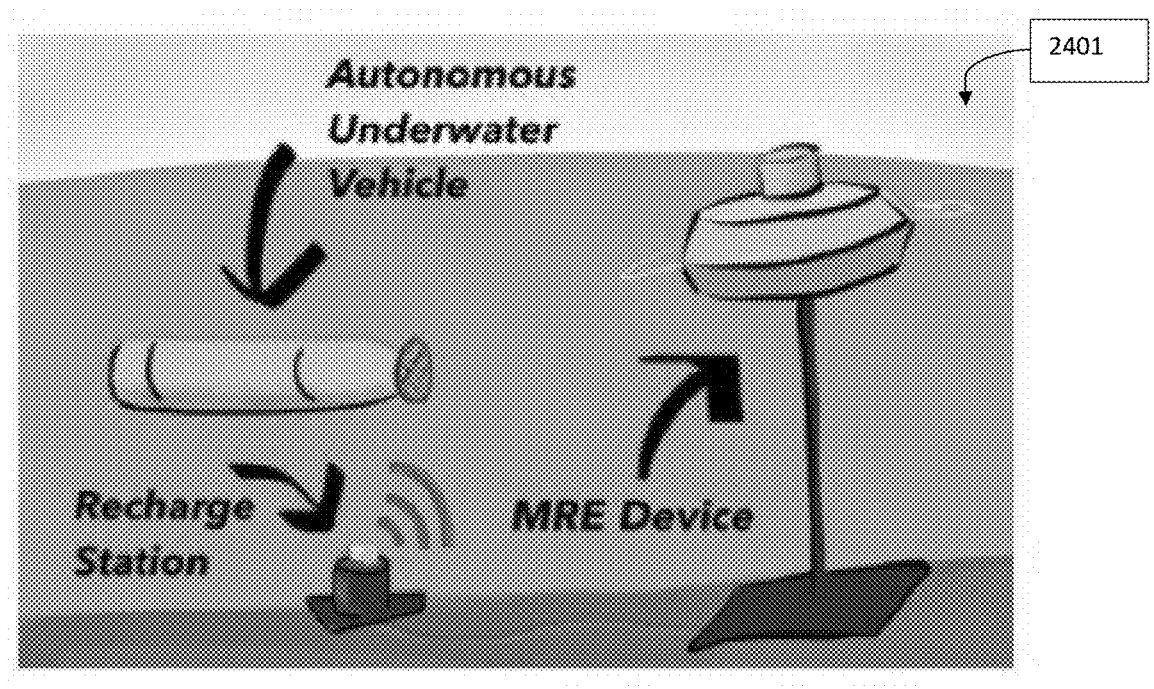
FIG. 24 is an illustration of a vehicle (an AUV here) charging system.
Figure 25:
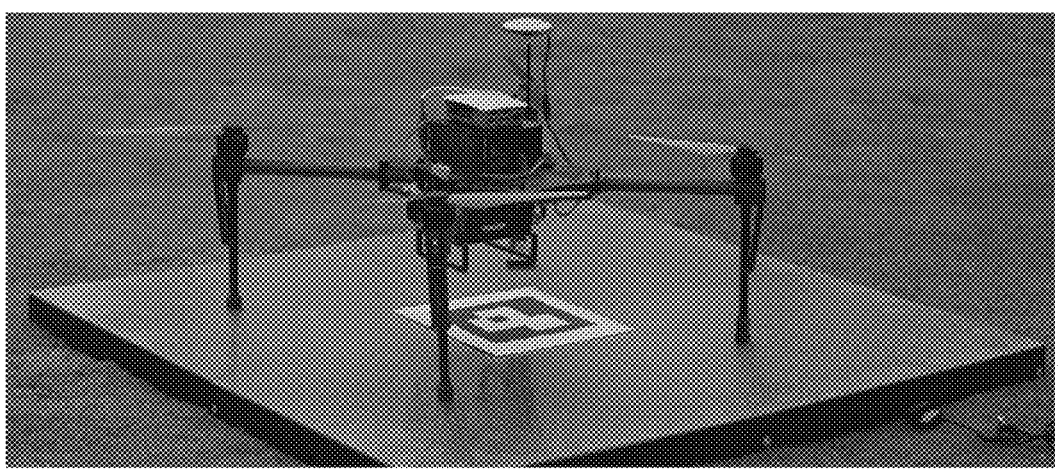
FIG. 25 is an exemplary vehicle (drone in this case) charging system.

Vehicle recharging systems (VRS): Device or apparatus to recharge vehicle(s). The recharging station may also be a launch and/or recovery system for vehicles. Examples shown in FIGS. 23 to 25.

Figure 3:
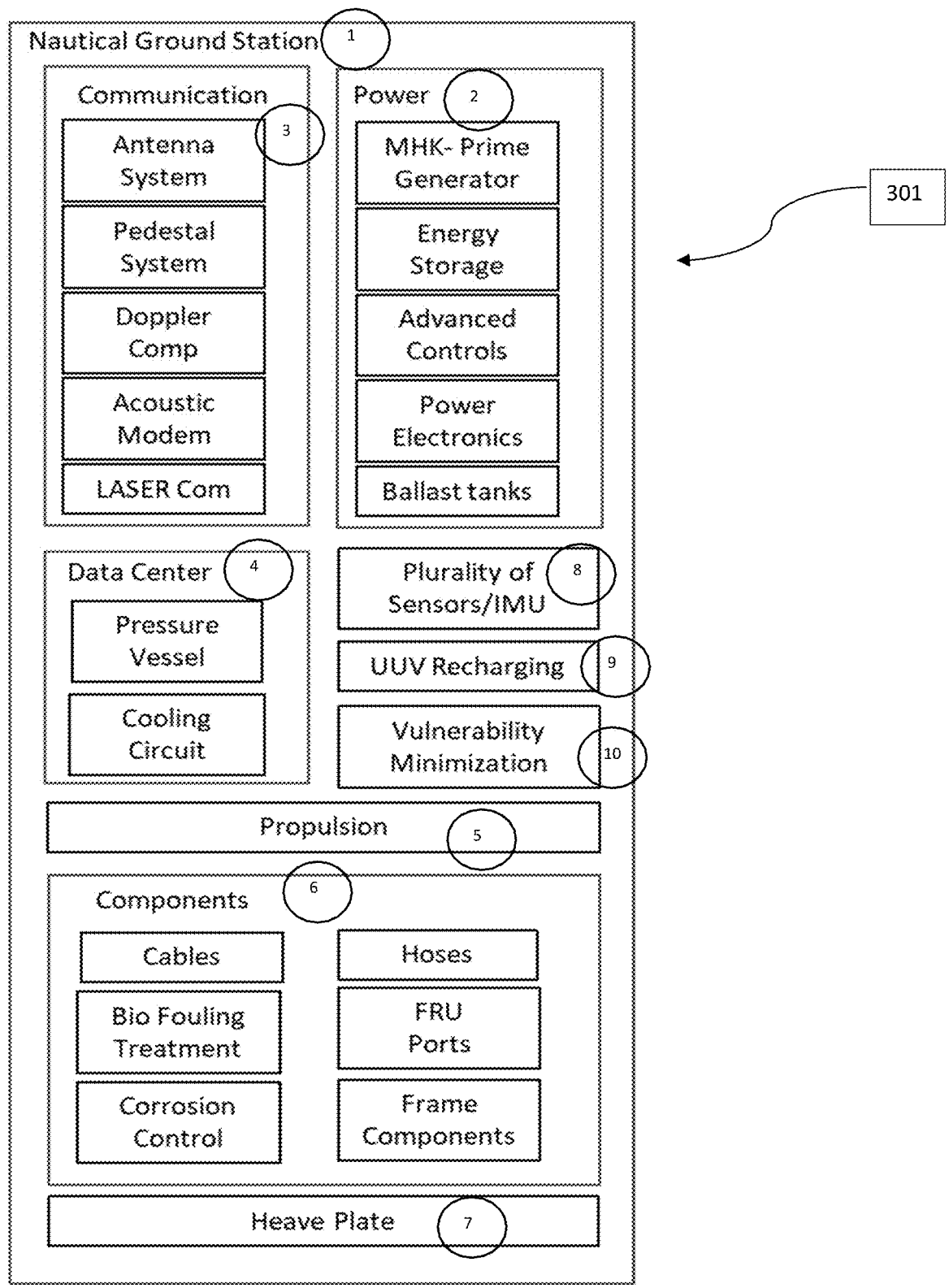
FIG. 3 is a system block diagram a mission persistent NGS to power N# Data Center servers.
Figure 4:
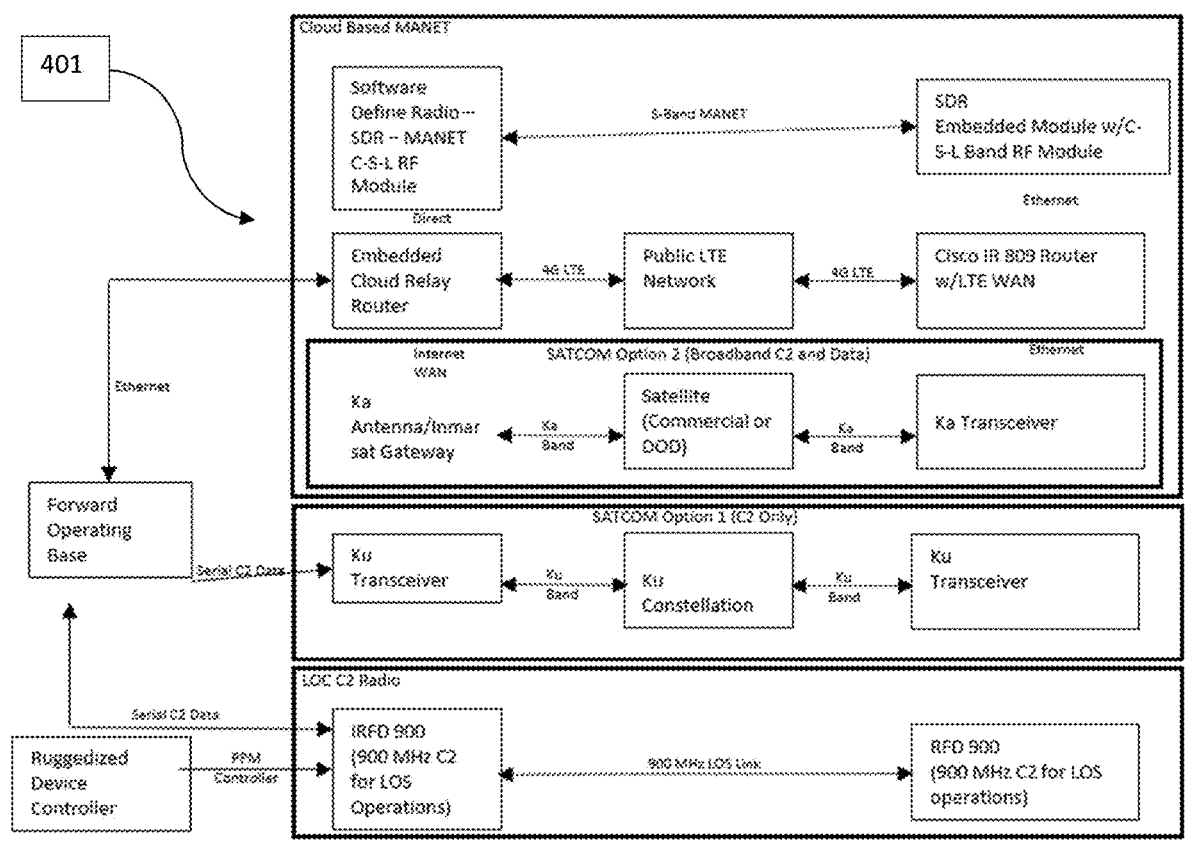
FIG. 4 is a High level representation of the Communication Gateway of subsea and terrestrial meshed networks with a SATCOM backhaul.
Figure 5:
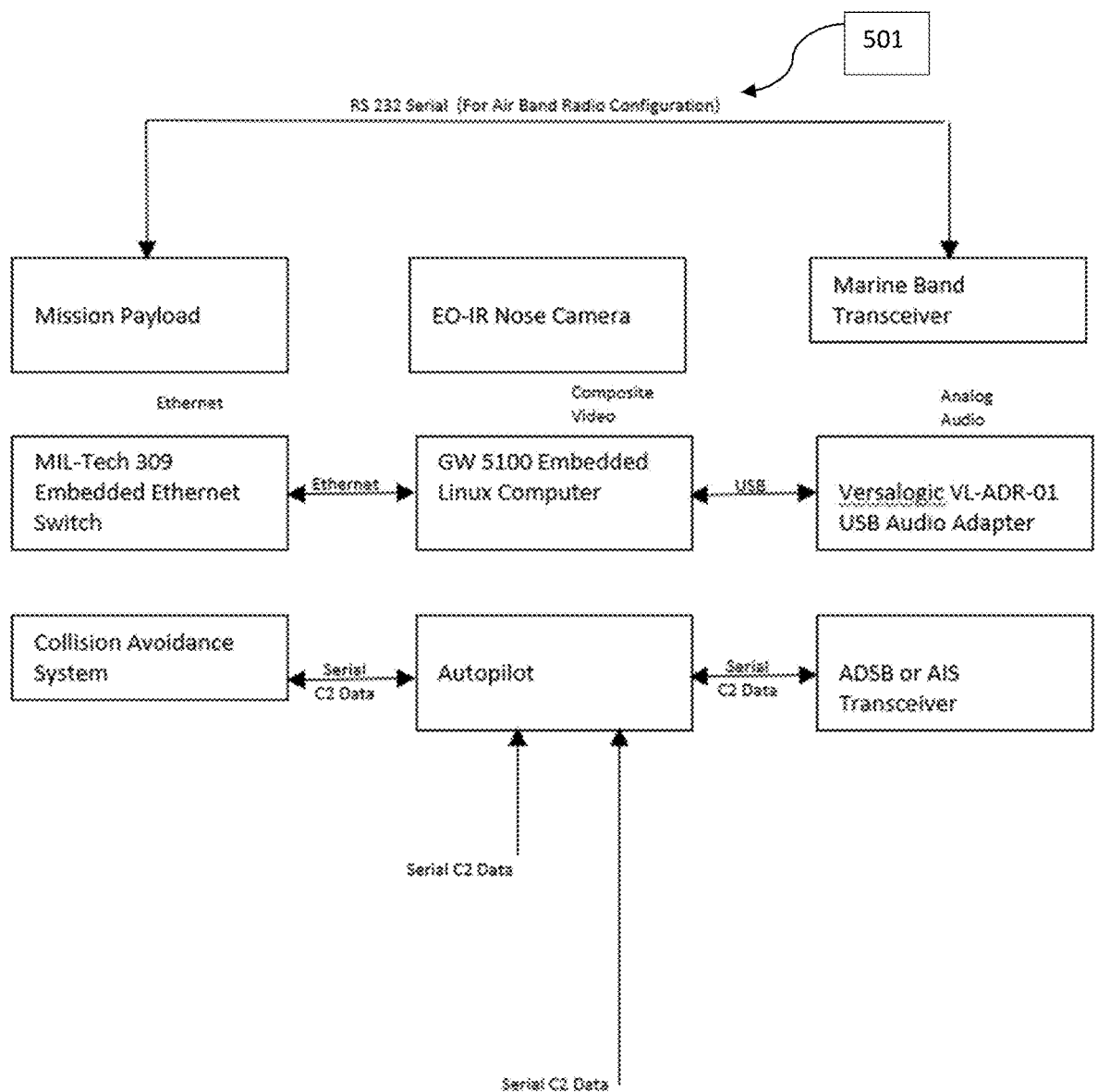
FIG. 5 is a system block diagram of the communication sub-system for C2 and Sensors.
Figure 6:
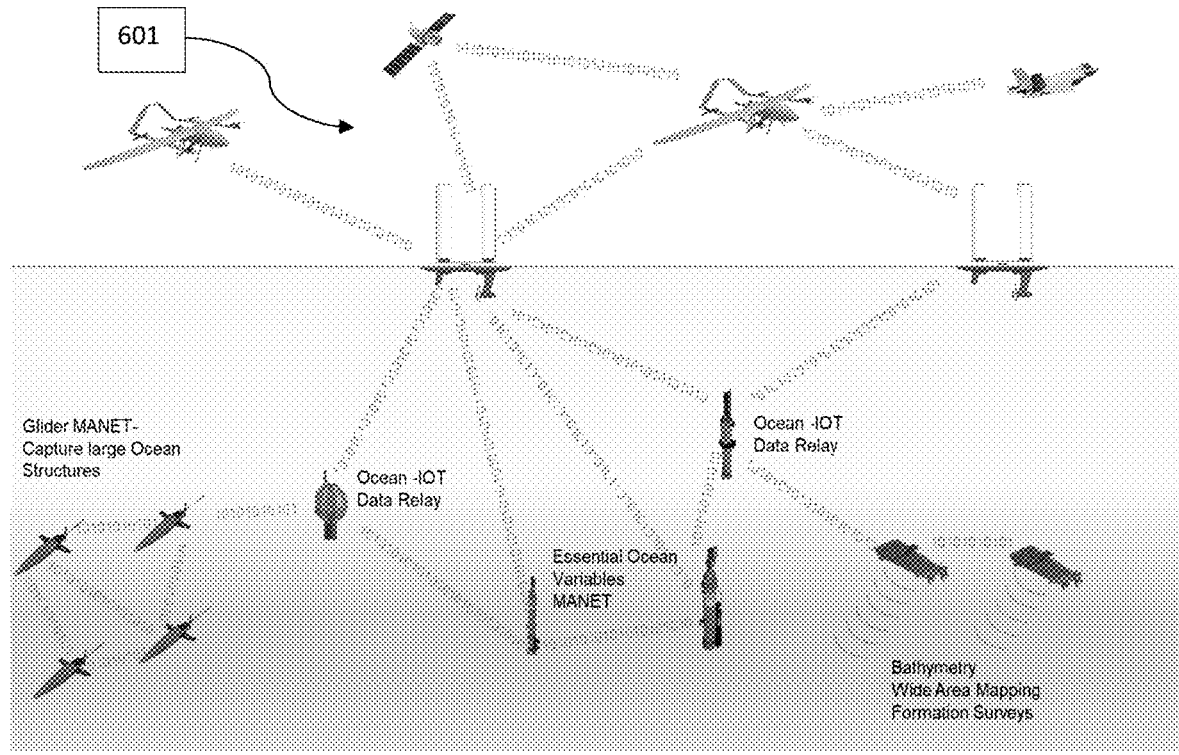
FIG. 6 is an illustration of multi-domain mesh network: communication gateway for subsea assets organized under a mesh and terrestrial mesh networks with SATCOM backhaul to a remote operating center not in direct RF link.
Figure 7:
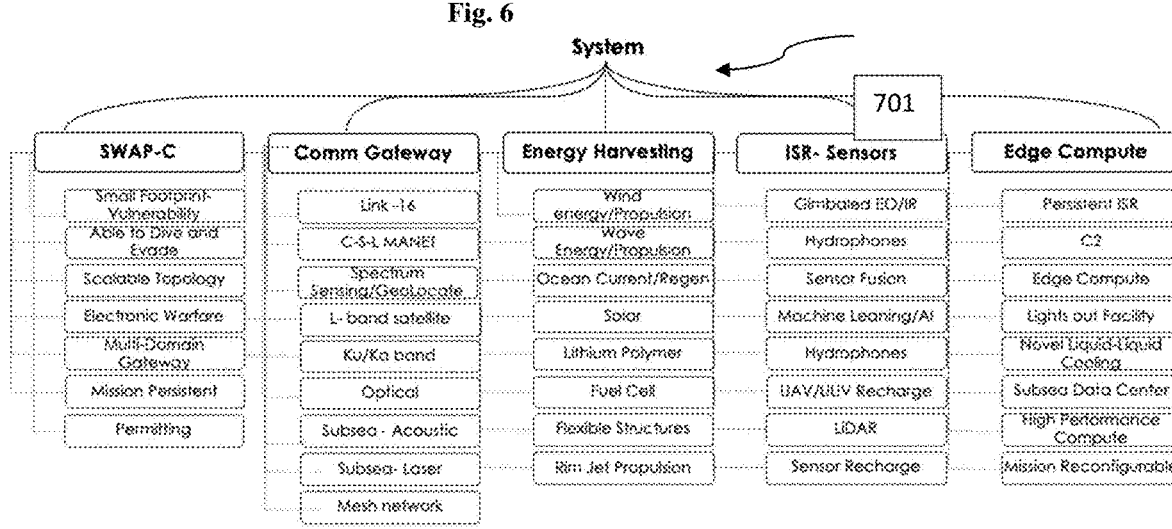
FIG. 7 is as system block diagram of the NGS system and component assemblies with permutations as a mission persistent platform as well as mission reconfigurable options.
Figure 8:
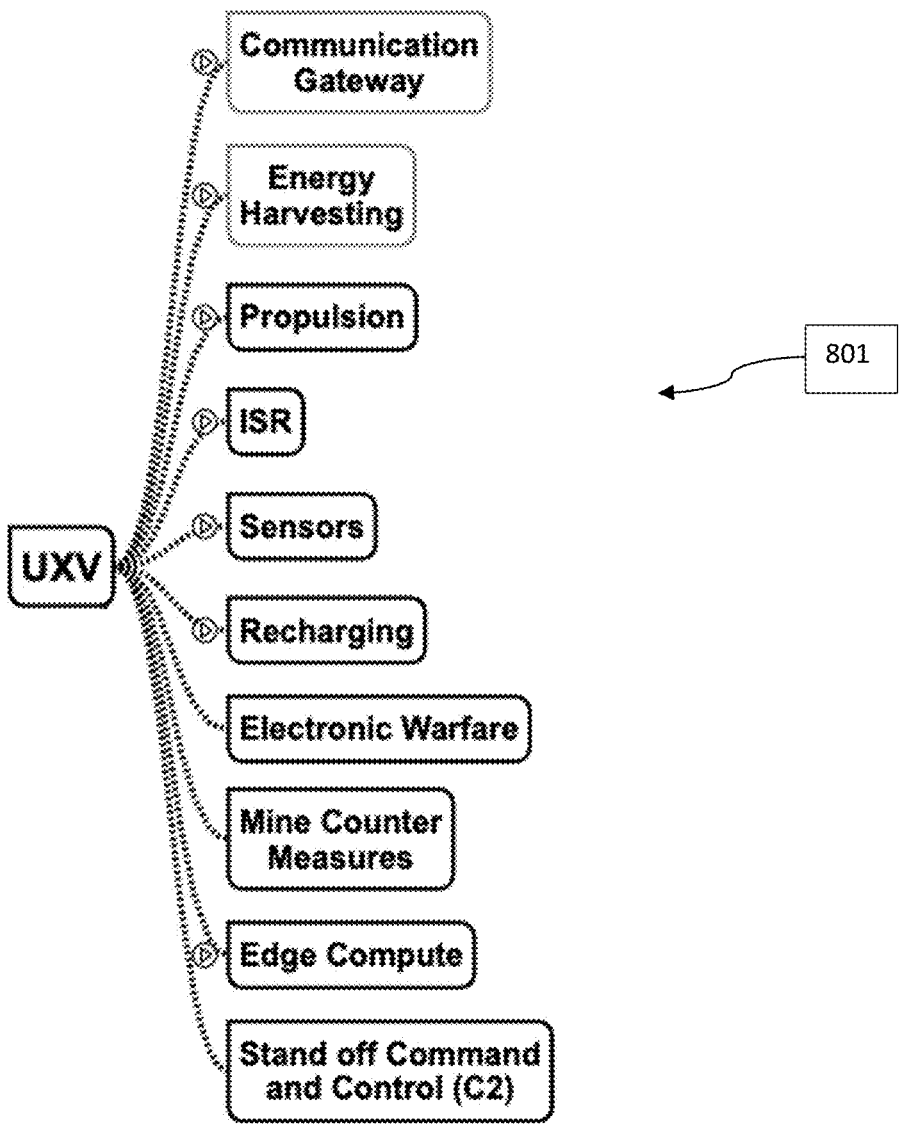
FIG. 8 is a representation of a typical NGS with its primary sub-assemblies and components.

An embodiment of the system of systems 1 consisting of a combination of some or all of the following connected in or to a network as shown in FIG. 3 where power subsystem(s) comprised of marine hydrokinetic (MHK) power generator, energy storage, advanced controls, power electronics and ballast tanks. Communication systems are comprised of antenna system, pedestal system, doppler compensation, acoustic modem and laser communications. A datacenter comprised of pressure vessel, servers, processing units, cooling circuits. A propulsion System in the form of a wave power generation device and, in embodiments may include fuel cells and/or solar or fossil fuel-based power systems. Components consisting of bio fouling treatment include corrosion control using zinc anodes, hoses, cables, field replaceable units and ports, frame components using materials such as copper, nickel, composites. In addition, the system uses a heave Plate or damping plate to mitigate wave action. There are a plurality of sensors and inertial measurement unit 9-UUV/UAV/UAS Charging station. Vulnerability minimization with reduced vulnerability signature is achieved by leveraging the submerged capability via ballast or small surface presence. There is minimal IR or RCS signature A further embodiment of the NGS is adapted for the reception and transmission of data from space. NASA estimates 10× growth in demand for space data over the next decade. While there has been cost disruption in launch system with the advent of SpaceX and Rocket lab as well as satellites themselves such as cube satellites ground stations have not been disrupted on a cost basis. Most of the population is located on the coastline. Latency is introduced with transferring data cross country as opposed to the end user.

Design considerations for low earth orbit (LEO) systems are especially challenging because of their high orbital speed, typically making a full orbit every 90-110 minutes. Because of this, a ground station serving a LEO satellite can only communicate with it during the brief windows of time when the satellite is above the station's horizon plane. This means that for multiple periods throughout the day, that station has no contact with the satellite. The earth is covered approximately by 71% water where currently no ground stations have been contemplated.

Permitting is a major challenge in siting a new ground stations which may take ~2 to 3 years. There is also significant regulatory challenge with frequency allocation. RF and optical regulatory hurdles with FCC or ITU may be reduced when siting water based ground station in international waters allowing rapid deployment. Spectrum interference is also ameliorated when a water based ground station is employed expanding frequency spectra options for stakeholders A nautical ground station acts as a mobile underwater data center capable of SATCOM backhaul mesh networking and edge processing to quicken data reduction by having constant connection to LEO, MEO and GEO satellites in real time. By virtue of using surrounding water this reduces the cooling and power requirements for the system. This can be achieved by raw seawater cooling, closed-loop cooling or liquid-liquid heat exchanger. In the advent communication infrastructure is not available, or a natural disaster has occurred an NGS provides relief. These transient events can be addressed with a mobile NGS that is able to be moved close to shore or theaters of operation and travel over bodies of water. Permit and building ground stations take considerable times ~2 to 3 years whereby a dispatchable solution such as a water-based ground station can provide instant communication in times of war or natural disasters.

The following examples depict uses of the GBS according to the invention and are not intended to limit the use of invention in any way. A first example uses the NGS as part of a cloud-based satellite antenna-sharing system. The service will allow satellite operators to share the use of antennae at different ground stations so they can have greater communication access to their satellites without needing to build more stations. This could make LEO SATCOM operations much easier and more consistent—and potentially cheaper, since fewer ground stations would need to be built.

For design considerations for low earth orbit (LEO) systems are especially challenging because of their high orbital speed, typically making a full orbit every 90-110 minutes. Because of this, a ground station serving an LEO satellite can only communicate with it during the brief windows of time when the satellite is above the station's horizon plane. This means that for multiple periods throughout the day, that station has no contact with the satellite. Invention would provide stations throughout the globe.

Figure 2:
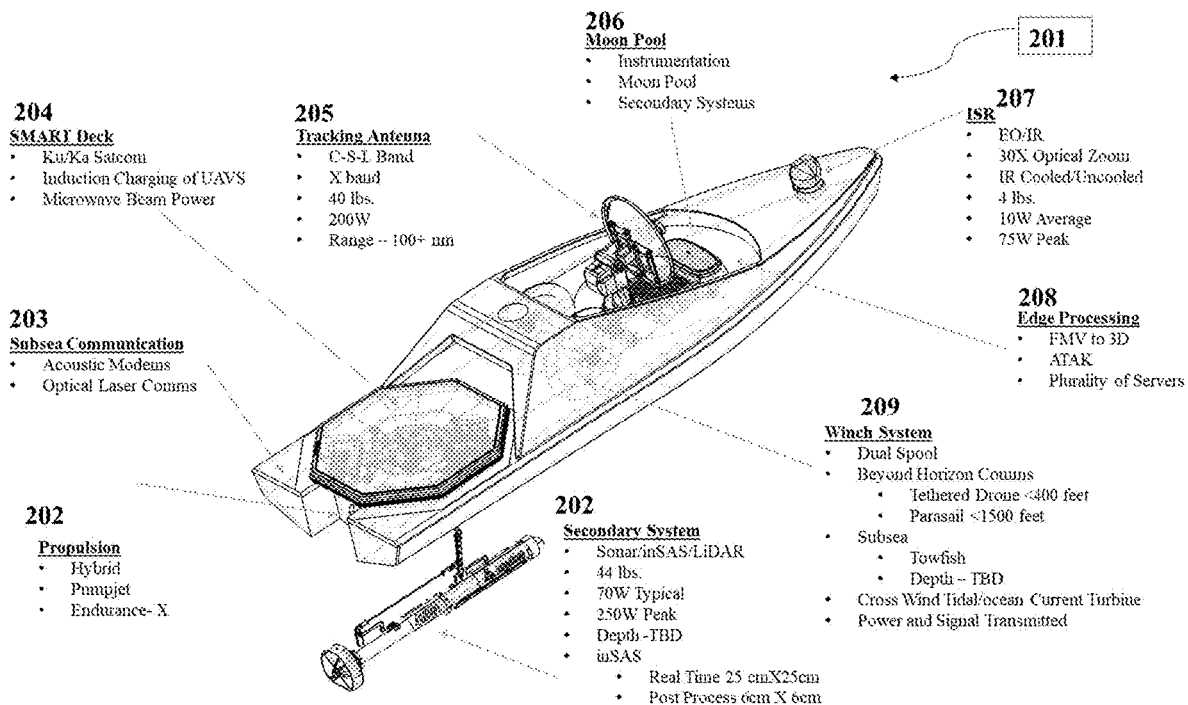
FIG. 2 is a perspective view of a conventionally powered UxV with Tethered System below.

The present invention described herein is intended for a nautical ground station as a mission persistent semisubmersible data center acting as a communication gateway under mesh network with satellite communication back haul. FIGS. 1, 2 and 3 an illustrate an unmanned semisubmersible vehicle referred to as the platform 101. These figures show the platform 101, 201 in a perspective and system block diagram view 301. The variation of the platform is to have N# servers in a N#U rack 102 that is cooled via surrounding water body using a closed looped heat exchanger and external keel coolers As a nautical ground station the platform can house N# servers 102 and cool them using the surrounding water via liquid liquid heat exchanger, raw seawater, or closed loop heat exchangers using an external keel cooler. The platform incorporates Software defined Radios—SDRs 103 that act as a self healing mobile ad hoc network covering frequency spectra from C-S-L bands. This self healing mesh network 103 is able to communicate with other platforms not in direct RF line through a high bandwidth satellite communication backhaul 104, 105, 106 to a remote operating center or other platforms acting in a coordinated manner such as a swarm. The Satellite communication antennas 104, 105, 106 are non parabolic dish flat panels that are electronically steered to reduce mechanical complexity and improve reliability. They cover bands from X, Ku to Ka 104, 105, 106. This communication topology allows for a PACE—Persistent, Auxiliary, Contingent and Emergency protocol to avoid any single point of failure and will switch to the strongest link in a contested or challenged environment The platform houses subsea sensors such as side scan sonar for hydrography 107 and the server rack houses 102 the IMU to process GNSS data for 3D bathymetry. The structure is a displacement hull 108 that is capable of semi submersions with a low radar cross section. The hull 108 is a novel construction method that is modular 113 and is not a point design. Sections of the hull are interchangeable to make it mission reconfigurable extending the length, endurance with interchangeable propulsion, secondary system, fuel section, moon pool, subsea winch, payloads, communication stacks, servers, etc depending on mission requirements bringing value added to platform owner. For instance a new sensor payload sections could be swapped out or longer fuel sections for improved endurance, secondary system (i.e Energy Harvesting, Prime mover, Sensors, etc). The autopilot will recognize these modules and configure the autonomous controls according to the configuration to maintain system stability communication and naval architecture principles of weight and trim. A secondary system 109 is tethered drone that is capable of elevating above the Fresnel zone to improve ship to ship communication as well as extend the range of unmanned aerial vehicles. The tethered drone 109, 110, 111 is powered 24/7 by an onboard prime mover such as a diesel electric generator or fuel cell. The tethered drone 109, 110 is an observation post with sensors such as an EO/IR camera and house N# SDRs radios to act as a communication relay 103, 109. The tethered drone is housed in a water proof container 109, 110 with retractable lid in transit to prevent salt spray impacting the system. The platform is statically and dynamically stable by the arrangement of subsystem in weight and trim to arrive at the appropriate righting moment for a variety of sea states.

The platform could be powered by conventional diesel electric 111 for specific periods, fuel cells 202 for zero carbon footprint or energy harvesting for zero carbon mission persistent capability. Conventional propulsion is achieved through a diesel electric 111 prime mover that powers an electric trawling motor 112 for long endurance applications >3 days for improved fuel efficiency. This will enable the system to transit at 3-5 knots and survey at 2 to 4 knots over a 4 day period. For operations close to shore a jet drive 203 could be used to complement the trawling motor to increase speeds in excess of 5 knots when near the surf line to get closer to shore albeit at lower endurance and fuel efficiency.

Another Embodiment is direted to a UxV Military Application: ISR, MSM, EW. The military may need the ability to switch between commercially available SATCOM 104, 105, 106 capabilities to tactical. Communication terminals are a major barrier to adopting space technologies per Pentagon's Analysis of Alternatives study. US military needs to upgrade or replace 17,000 SATCOM terminals to buy any commercial SATCOM capabilities. Operating military terminals account for 70% of SATCOM costs. Tactically SWAP-C Small Attritable, modular, mobile, multi-domain easy to operate and integrated SATCOM terminals would address military immediate needs and also enable unmanned distributed assets in remote areas critical for high accuracy decision making, readiness and resiliency. This would provide significant cost and man hours savings while adding ability to leverage space capabilities. Larger tactical systems can provide edge compute capability for terrestrial and subsea assets as a communication gateway and data processing center using sensor fusion ML/AI techniques to provide Command Control-C2.

UxV Key Differentiator: The UxV provides ISR 109, 107, EW 104, 105, 106, 102 and MCM 107 capabilities as a multi mission communication gateway. The UxV has a low RCS cross section able to "soak" an area for threats from MANET C-S-L 103 band, SATCOM (Ku, Ka, X, L) 104, 105, 106. This system is designed to be as a standoff asset reconfigurable tethering an ROV via a fiberoptic where the power resides on the ROV to reduce the surface expression/size of the host ship. The UxV provides acts as communication gateway allowing real time exfil of data and power to recharge the ROV.

ISR: The ISR missions are accomplished using a tethered drone 109 allowing a 24/7 communication relay and sensor observation post. This arrangement improves ship to ship communication by getting above the Fresnel zone. In addition this secondary system improves communication with Unmanned Aerial systems by extending their range. As a subsea ISR platform the UxV can take Side scan sonar payloads 107, process locally 102 and send real time via the mesh network 103 to forward operators. By placing an IMU 102 on board this data can be turned into 3D Bathymetric 107 maps and if done in concert with other UxV devices the data can be sensor fused to provide a large wide scale mapping using process algorithms FMV to 3D. As an ISR platform the system uses a tethered drone can provide ship to ship communication by elevating N# radios above the fresnel zone and curvature of the earth for improved line of sight communication. By using N# platform organized under a mesh network ship to ship communication can be conducted over the horizon to greater distances and in the instance of not being in direct RF link communication can be established with a SATCOM backhaul. Situational awareness is accomplished via ATAK on ruggedized android controller for forward operators or WinTAK at Tactical operating centers or Forward operating bases that may or may not be in direct RF link. The tethered drone could use an EO/IR camera at election above the waterline to give great sight distance as an observation post as well as elevate sensors such as LiDAR to map shore lines to complement the hydrography to give a complete battlefield assessment for a landing party or coastal surveys. The Tethered drone can be optionally tethered as a fly away system to increase communication distanced. Alternatively, UAVS could land and retrieve onboard the platform to recharge or act as communication relays or ISR platforms out to greater distances from the platform.

Electronic Warfare or EW: The UxV has a low RCS cross section able to "soak" an area for threats from MANET C-S-L band 103, SATCOM (Ku, Ka, X, L) 104, 105, 106. It can act as a reference emitter, act as a decoy or geolocate threats. As an Electronic Warfare—EW platform the self healing mesh network and SATCOM capability can soak the area for threats ahead of an engagement. The platform can act as a reference emitter, geo location device or as a low SWAP-C EW decoy.

Mine Counter Measures or MCM: As a Standoff C2 can act as a tool in MCM by taking sonar data from a secondary asset 202, 203 and process locally or act as a primary device through an integrated hull transducer or tethered secondary system or communicate with a secondary system via optical acoustic modem. As a mine counter measure-MCM application the platform could be used to provide mine identification using an integrated sonar. As a standoff C2 platform it could provide guidance to a secondary subsea system such as an AUV or Tethered ROV in real time via mesh network and SATCOM.

A further is directed to an Ocean Observation and Recharging Station. Deep Sea Exploration is encumbered with large ships of opportunity with scientific research being carried out using ROVs, AUVs or Manned Submersibles. The DOSP FIG. 2 is an Autonomous unmanned systems that is controlled by an operating center out of direct RF link providing an opportunity for cost disruption with disparate assets organized under a self-healing mesh network to provide an integrated global structure. The deep ocean below 200 m water depth is the least observed, but largest habitat on our planet by volume and area. The deep ocean remains under sampled and under observed at great depths and in many regions. It is estimated only 2% of observations in the Ocean Biogeographic Information System (OBIS) are from water depths greater than 500 m. A real time communication gateway 103, 104, 105, 106, 203 that allows the edge compute 102, 208 and control of an undersea constellation of sensors and subsea assets can capture larger ocean structures while increasing the temporal and spatial solution of the deep sea not currently understood and its relationship with climate regulation and the blue economy (undersea mining, aquaculture, etc).

DOSP Key Differentiator: A deep ocean sensing platform provides a means of exfil of data 103, 203 205, 206 in real time via a SATCOM 104, 105, 106 backhaul organized under a terrestrial and subsea self healing mesh network. The DOSP has the ability to provide stand off command and control to undersea assets via a fiberoptic tether 209 of optical/acoustic modems 203, process the data at the edge 102, 208 with the onboard liquid cooled servers and transmit via MANET 103, 205 or 104, 105, 106 SATCOM beyond Line of sight communication to a tactical operating base or Forward operating base without the need for expansive manned ships of opportunity to support which can ran at several hundred thousand dollars/day for operation. The DOSP has the ability to provide recharging capability to secondary undersea 202 and terrestrial assets 204 as well as exfill the raw or edge processed data. Traditional Autonomous Unmanned Vehicles ("AUV") are limited in range and/or power the presented UxV provides an ability to extend the range of open ocean AUVs by recharging them 202 and providing a high bandwidth SATCOM backhaul 104, 105, 106 of the data. A UAV on a long durance mission could use the DOSP as a means to recharge 204, receive new C2 instructions, process the data and send results via high bandwidth SATCOM backhaul completely autonomously without the need of manned ships of opportunity thus reducing the day rate for exploration by orders of magnitude. As a recharging station for autonomous systems the platform will use the energy harvested or stored by conventional means to inductively or directly recharge secondary systems whether airborne or subsea. For airborne applications an inductive platform or smart deck 204 will be used that combines functions of flat panel steerable antenna, microwave beam energy to power UAV wirelessly or induction charging incorporated into the same smart deck. Subsea the platform would have a moonpool 206 for the system to dock internally or externally to charge and exfil data. For subsea assets such as UUVs, AUVs or ROVs the platform can extend a tether from an onboard winch that docks with a standard defined interface. This tether 209 decouples the platforms surface motion from docking. The tether is comprised of signal and power to extract data from the secondary subsea system 209 and relay via the SATCOM backhaul 104, 105, 106 or MANET 103 the power is used to recharge the system using the onboard conventional power or harvested energy. The DOSP acts as a communication gateway between subsea and terrestrial assets and communication via SATCOM out of direct RF link.

Another feature in embodiment of the invention involves providing for mission persistence by energy Harvesting. In another implementation a method of powering a nautical ground station FIG. 3 is disclosed and comprises of generating electric power and self-propulsion to be an autonomous mobile mission persistent platform by acting as a microgrid through energy harvesting electrical power using marine hydrokinetic, solar, wind near or reacting with the floating platform coupled with energy storage comprised of fuel cells or batteries to meet ground station duty cycle requirements, circulating water adjacent to the floating platform through a liquid-liquid or liquid-air heat exchanger to provide cooling for ground station ancillary electrical equipment with a plurality of high performance computing servers.

In some aspects, self-propulsion can be accomplished using a variety of energy harvesting methods from solar, wind, and marine hydrokinetics coupled with energy storage depending on the duty cycle and resource availability. For wind energy a Magnus or Flettner rotor is considered with the possibility of telescoping the cylindrical elements as well as rotate for a means of propulsion. This could also be used a means of energy capture/generation to power onboard batteries of liberate oxygen/hydrogen for a fuel cell. A wind ship aerofoil is considered as a means or propulsion as a means of a flexible structure that collapses to the deck in extreme events or reduced vulnerability, shape changing airfoils is also considered as a mean of control. Self=propulsion or generation can be accomplished with articulated foils or hydrofoils below the vessel or flexible structure that use di electric fluid or fluid power extracted from waves hitting the hull surface. Solar panels would be implemented on the ship top side hull, sail via flexible structure or as a part of a deployable structure from the body of the system. Energy storage could be accomplished using batteries in the keel of the ship for weight and trim Naval architecture as well as hydrogen fuel cells to bridge resource requirement duty cycles in changing resource environments.

By virtue of harvesting energy from wave, wind, currents, and solar this energy can be used to propel the device via self-propulsion and excess energy stored via batteries or converted to hydrogen through use of an electrolyzer and fuel cell. A mission persistent platform would extend the range and durance or the NGS, DOSP and UxV from a few days to unlimited time by vesture of energy harvesting and matching the duty cycle of the respective devices. This provides for a zero carbon platform to perform observations as a mission persistent platform for ocean observation, recharging of secondary autonomous systems, ISR/MCM/EW as well as process data at the edge as an underwater data center or real time connection by better world coverage of LEO assets to process as a NGS.

As mission persistent platform FIG. 3 the platform would use energy harvesting from a variety of sources such as marine hydrokinetic (MHK)—Wave, Ocean Current, Ocean Thermal as well wind and solar. For MHK the Platform would be arranged in a multi hull such as trimaran configuration whereby the outer pontoons would react against the hull to drive linear generators or hydraulic rams to produce electricity. Additionally, by using advanced controls to match force and velocity the power can be increased. Alternatively, for improved link budgets and communication the advanced controls can be used to stabilize the platform using the pontoons in a feedback loop in higher sea states. The power derived from this would power subsystems (communication, sensors, propulsion) excess stored in batteries or electrolzyed into hydrogen and stored. For a hydrogen derivation the gaseous/liquid hydrogen would be stored in pressure vessels in the pontoons and later used to power a hydrogen fuel cell for propulsion or power subsystems. Propulsion could also be derived from wind power by placing sails, flettner rotors, flexible structures on the pontoons of the multi hull trimaran. Another means of wind power would be derived from using the on board tethered drone as a cross wind turbine as a high altitude wind device or cross wind a parasail to double as a communication relay, ISR observation post and wind energy harvesting tool. A propulsor could be used in conjunction for station keeping or regenerative power when the platform is underway using wind power. The platform can also use wave forces in heave and surge using articulated hydrofoils to propel the system forward. These hydrofoils could also be used to life the platform out of the water to reduce drag on the multi hull when under wind power. Solar panels on the top side of the system could be used to provide hotel power in time of low resource and augment the energy harvesting power production

Definitions

Figure 9:
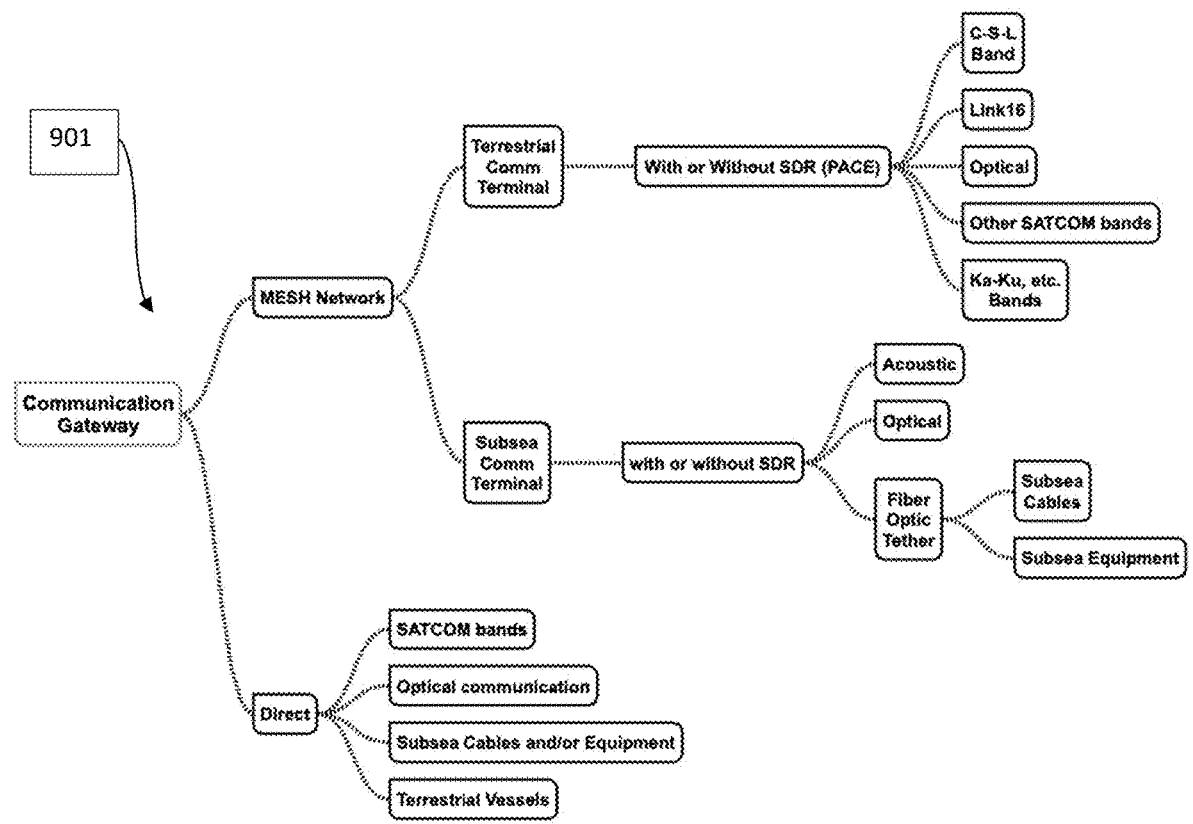
FIG. 9 is a representation of a typical NGS as a communication gateway under a self-healing mesh network.
Figure 10:
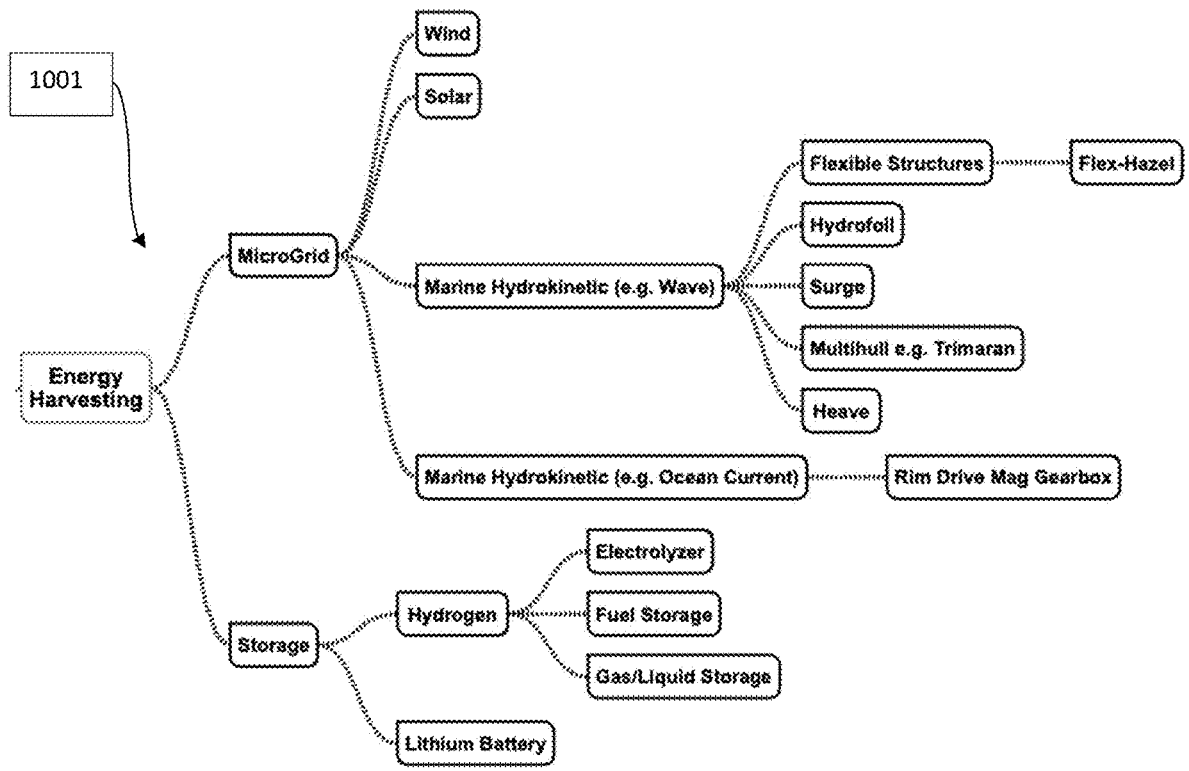
FIG. 10 depicts components and sub-components of Energy Harvesting Subsystem to generate and store energy for sensors and other payloads.
Figure 11:
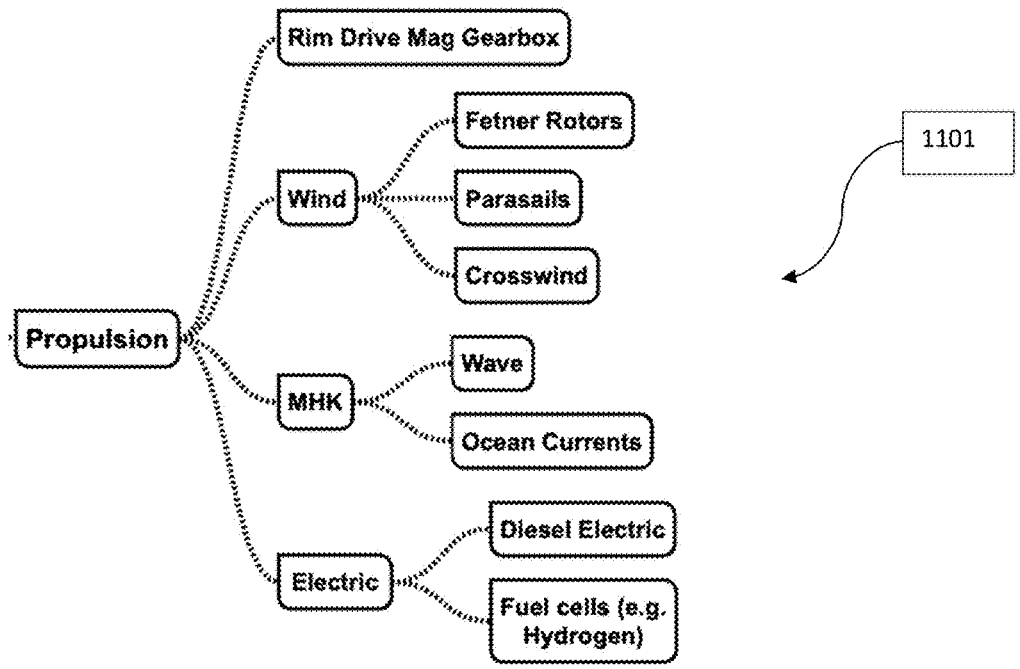
FIG. 11 depicts components and sub-components of the Primary Propulsion Subsystem to propel the UxV device.
Figure 12:
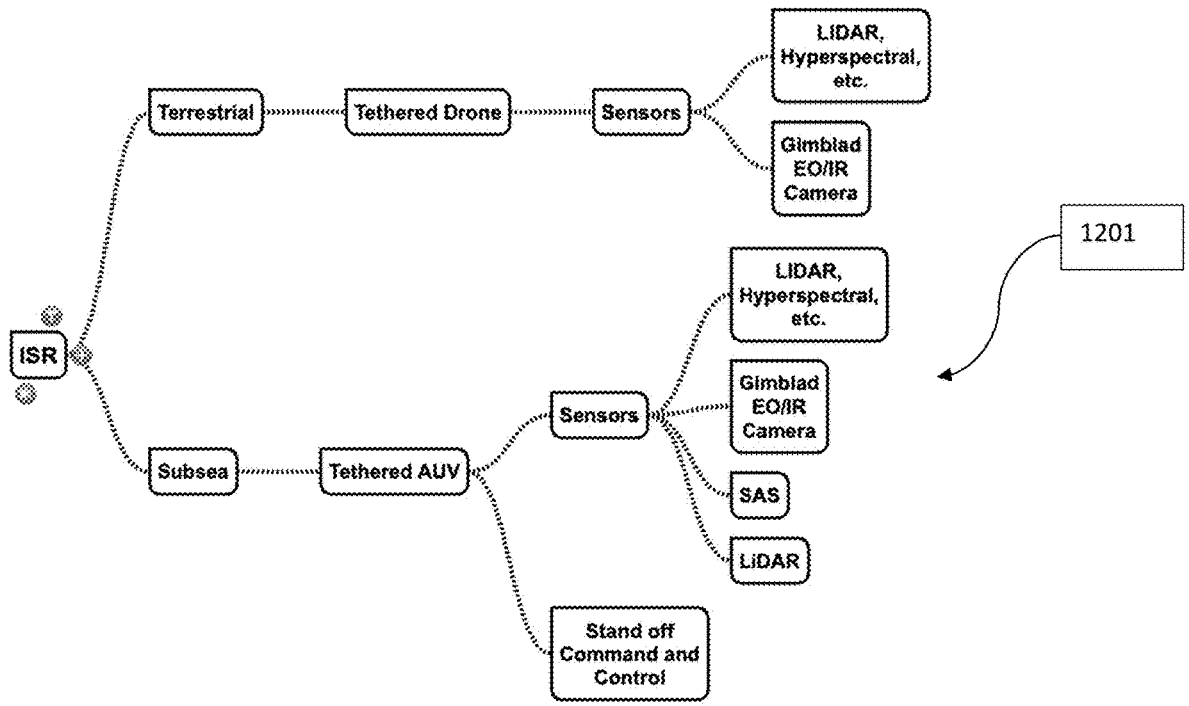
FIG. 12 depicts the components and sub-components of Intelligence and Surveillance Reconnaissance (ISR) subsystem executing operations from above (air and space), at and below the fluid surface with sensors for audio, visual, environmental (e.g. hydrographic) with a command and control capability.
Figure 13:
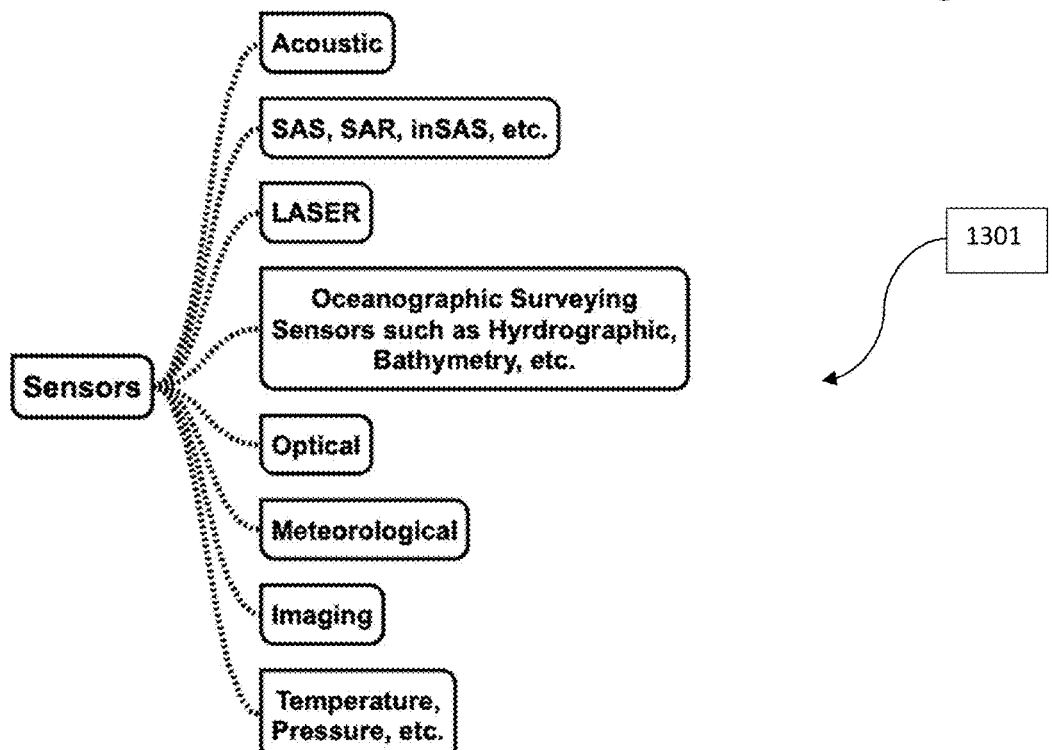
FIG. 13 is an exemplary group of sensors (e.g. acoustic, environmental, visual, etc.) that would constitute the sensors sub-assembly.
Figure 14:
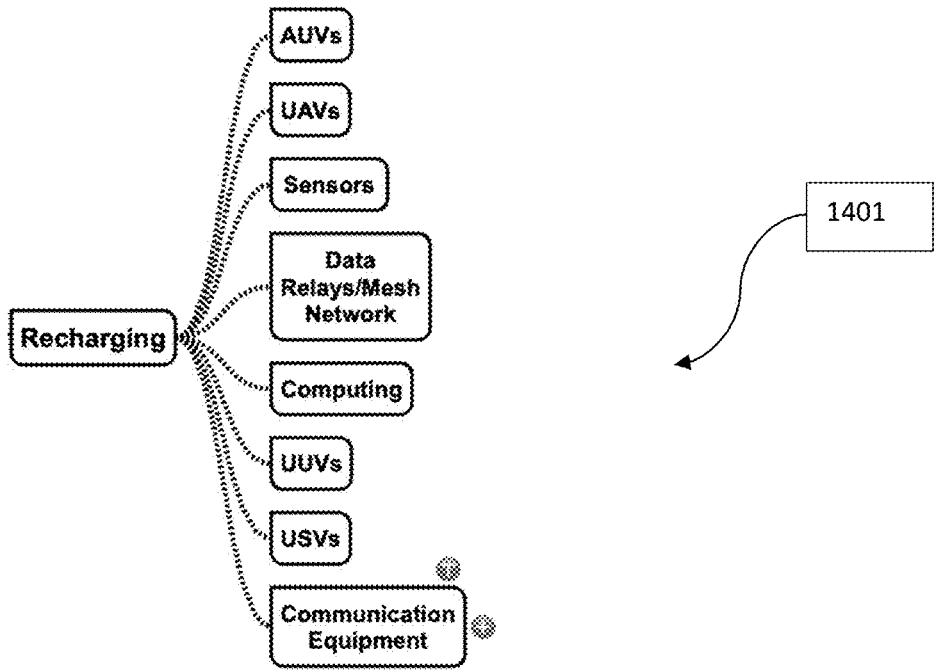
FIG. 14 shows the recharging sub-assembly and components for recharging the UxV or other vehicles.
Figure 15:
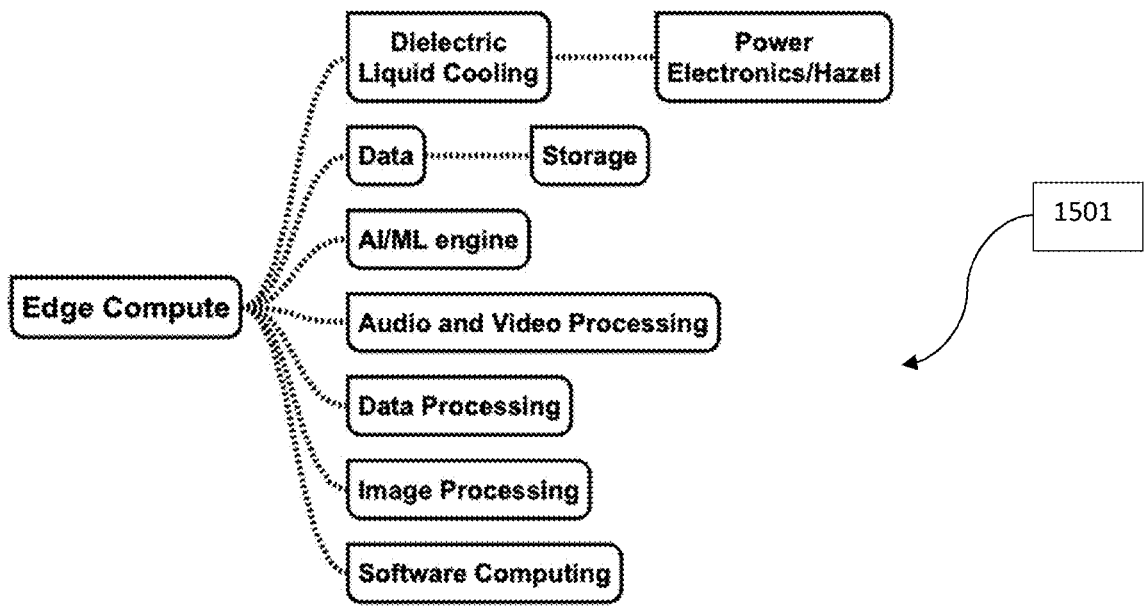
FIG. 15 shows the edge-compute sub-assembly and components to help pre-process data prior to transferring off the UxV, processing data for decision and operations to be performed on-board the UxV or processing data for other assets in multidomain.
Figure 16:
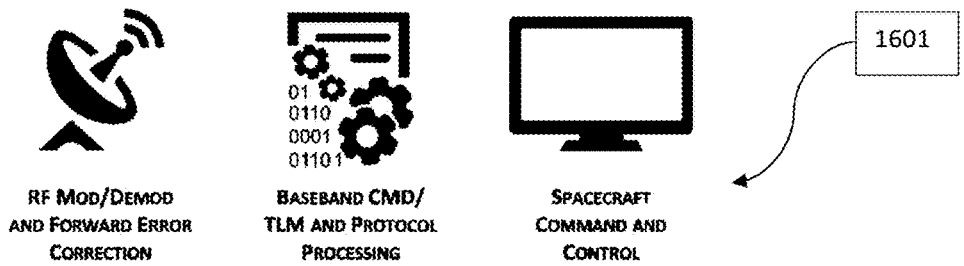
FIG. 16 depicts the major components of a typical ground station.
Figure 17:
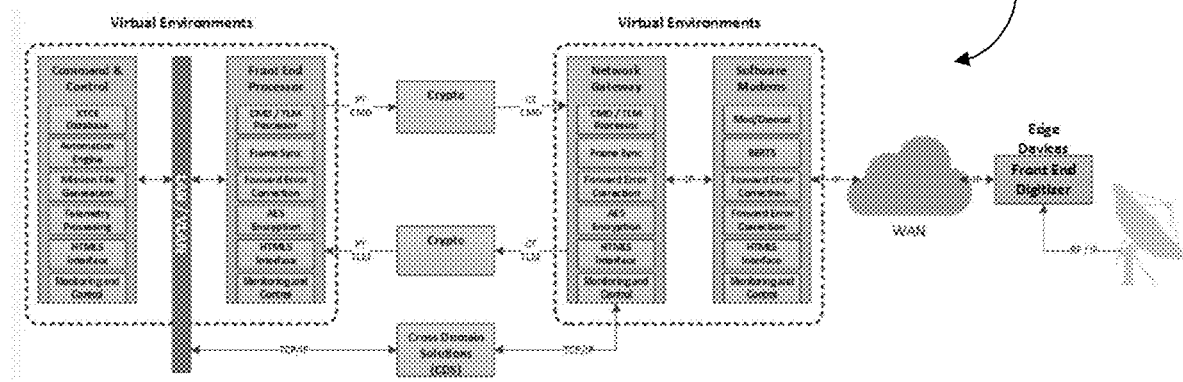
FIG. 17 illustrates major components of a new ground station.

The following definitions are directed to terms used herein:
1. Network: Network made of two or more nodes and/or networks in space, land, air or water based such as MC3, Globalstar, IRIDIUM, fiber optic intercontinental lines, etc. FIG. 9 and FIG. 10 illustrate network topologies.
2. Vehicle: A satellite, drone, unmanned autonomous vehicle (UAV), underwater UAV, Unmanned Surface Vehicles-USV, self-propelled ocean devices like one used by liquid robotics or saildrones, aircraft, spacecraft, ship, boat, barge, land based vehicle, vehicle moving on land, in or on water and in or out of atmosphere in space or remotely operated vehicles.
3. Node: A ground station, a new ground station, vehicle, ground segment, internet cloud, datacenter, telco towers, computing centers, relay centers. Nodes could be located in space, water, land or air.
4. Power subsystem: The subsystem includes propulsive and/or stationary power generation systems. Power generation system(s) would likely include but are not limited to marine hydrokinetic such as wave energy, tidal, ocean current, wind, linear generators, etc. or fossil fuel-based such as diesel generator or solar or battery, self-propelled devices (e.g. liquid robotics or saildrone), fuel cells, etc. or nuclear a combination of such power generation systems, energy storage, advanced controls and power electronics, cables, Field Replaceable Unit Ports, vulnerability minimalization.
5. New Ground Station (NGS): It is a modern ground station that sends electromagnetic spectrum signals (radio, optical or other) to satellite (uplink) and receives data transmissions from the satellite (downlink). A new ground station can consist of combination of some or all: softcog radio, antenna system including but not limited to antenna(s) or arrays including active electronically scanned array or electronically steerable antennas (example shown in FIG. 11), software modem(s), acoustic modem(s), laser communications, data processing, signal processing, a computer, edge compute capabilities, security (crypto and other), telemetry, tracking, control and command, monitoring as well as mission control center(s). The data uplink and downlink would transmit electromagnetic waves including RF, optical, over fiberoptic lines, laser or microwave. Example is shown in FIG. 1.
6. Software modem: A softmodem (software modem) is a modem with minimal hardware that uses software running on the host computer, and the computer's resources (especially the central processing unit, random access memory, and sometimes audio processing), in place of the hardware in a conventional modem.
7. SoftCog radio(SR): SoftCog is a combination or hybrid of software-defined radio and cognitive radio. Software defined radio is a radio communication system where components that have been traditionally implemented in hardware (e.g. mixers, filters, amplifiers, modulators/demodulators, detectors, etc.) are instead implemented by means of software on a personal computer or embedded system. Cognitive Radio (CR) is an adaptive, intelligent radio and network technology that can automatically detect available channels in a wireless spectrum and change transmission parameters enabling more communications to run concurrently and also improve radio operating behavior.
8. Ground Station(GS): A ground station that sends electromagnetic spectrum signals (radio, optical or other) to satellite (uplink) and receives data transmissions from the satellite (downlink). Ground stations provide electromagnetic spectrum signals (radio, optical, etc.) interfaces between air, space and ground segments for telemetry, tracking, and command (TT&C), as well as payload data transmission and reception. Tracking networks, such as NASA's Near Earth Network and Space Network, handle communications with multiple spacecraft through time-sharing. Ground station equipment may be monitored and controlled remotely, often via serial and/or internet protocol interfaces. The data uplink and downlink would transmit electromagnetic waves including RF, optical, laser, over fiber optic lines or microwave. The basic elements of space ground system as shown in FIG. 2 typically include:
    a. Telemetry, tracking, and command (TT&C) systems used by operators to issue spacecraft commands and view Telemetry
    b. Front End Processors (FEPs) that proxy cryptographic gear from the TT&C engine
    c. Encryption for command link protection
    d. Network gateways used for deterministic wide area networks (WAN) transport and black side crypto interfaces
    e. Terminal side gateway equipment to bookend the network
    f. Modulator/Demodulator systems for narrowband and wideband links
    g. Up/Down frequency conversion to the antennas and the antennas themselves
9. MC3: Mobile Cubesat Command and Control (MC3) ground station network is a DoD-led effort to populate common-use satellite communications equipment across a community of users who perform research with small satellites for the US government.
10. IRIDIUM: The Iridium satellite constellation provides L band voice and data information coverage to satellite phones, pagers and integrated transceivers over the entire Earth surface.
11. Global Star: It is a satellite constellation operating in a low Earth orbit (LEO) for satellite phone and low-speed data communications, somewhat similar to the Iridium satellite constellation.
12. Telemetry: It is the in situ collection of measurements or other data at remote points and their automatic transmission to receiving equipment (telecommunication) for monitoring.
13. Cryptographic gear: Network hardware cryptographic devices include devices capable of accelerating and decrypting Secure Sockets Layer (SSL), as well as hardware devices that ensure that the information stored in the hardware is protected from external software attacks.
14. Modulation and Demodulation: In electronics and telecommunications, modulation is the process of varying one or more properties of a periodic waveform, called the carrier signal, with a separate signal that typically contains information to be transmitted. The term analog or digital modulation is used when the modulating signal is analog or digital, respectively. A modulator is a software or hardware device that performs modulation. A demodulator (sometimes detector or demod) is a software or hardware device that performs demodulation, the inverse of modulation. A modem (from modulator-demodulator) can perform both operations.
15. Crypto: Short for cryptography wherein a cryptosystem is a suite of cryptographic algorithms needed to implement a particular security service, most commonly for achieving confidentiality (encryption). Crpto systems: Typically, a cryptosystem consists of three algorithms: one for key generation, one for encryption, and one for decryption. The term cipher (sometimes cypher) is often used to refer to a pair of algorithms, one for encryption and one for decryption. Therefore, the term cryptosystem is most often used when the key generation algorithm is important. For this reason, the term cryptosystem is commonly used to refer to public key techniques; however both "cipher" and "cryptosystem" are used for symmetric key techniques. Proxy crypto gear or Proxy re-encryption (PRE) schemes are cryptosystems which allow third parties (proxies) to alter a ciphertext which has been encrypted for one party, so that it may be decrypted by another.
16. Encryption: Encryption is the method by which information is converted into secret code that hides the information's true meaning. The science of encrypting and decrypting information is called cryptography.
17. Up/Down conversion: In digital signal processing, a Up/Down digital converter (DC) converts a digitized, band-limited signal to a higher/lower frequency signal.
18. RCS Signature: Radar Cross Section Signature is a measure of how detectable an object is by radar. Therefore, it is called electromagnetic signature of the object.
19. SSL: Secure Sockets Layer (SSL) is a protocol developed by Netscape for providing a secure connection between two or more devices via the Internet. SSL uses a cryptographic system that uses two keys to encrypt data—a public key known to everyone and a private or secret key known only to the recipient of the message.
20. Embedded system: It is a microprocessor-based computer hardware system with software that is designed to perform a dedicated function, either as an independent system or as a part of a large system. At the core is an integrated circuit designed to carry out computation for real-time operations.
21. Ballast tank: It is a compartment within a boat, ship or other floating structure that holds water, which is used as ballast to provide stability for a vessel. Using water in a tank provides easy weight adjustment.
22. Doppler Compensation: When an echolocating bat approaches a target, its outgoing sounds return as echoes, which are Doppler shifted upward in frequency. In certain species of bats, which produce constant frequency echolocation calls, the bats compensate for the Doppler shift by lowering their call frequency as they approach a target. This keeps the returning echo in the same frequency range of the normal echolocation call. This dynamic frequency modulation is called the Doppler Shift Compensation (DSC).
23. Biofouling Treatments: They include anti-fouling–the process of preventing accumulations from forming and treatments where biological organisms are killed or repelled with coatings using biocides, thermal treatments, or pulses of energy.
24. Heave Plate: Wave energy converters (WECs) often employ submerged heave plates to provide reaction forces at depths below the level of wave motion.
25. Spectrum interference or jamming: Electromagnetic Spectrum jamming is the deliberate jamming, blocking or interference with transmitting electromagnetic signals for example to disrupt communications.
26. Sensor Fusion: Sensor fusion is the ability to bring together inputs from multiple radars, lidars and cameras to form a single model or image of the environment. The resulting model is more accurate because it balances the strengths of the different sensors. Fusion is combination of one or many of the following: text, data, metadata, images, video, audio, location, altitude, depth from multiple sensors. Metadata is a set of data that describes and gives information about other data.
27. IMU: An inertial measurement unit (IMU) is an electronic device that measures and reports a body's specific force, angular rate, and sometimes the orientation of the body, using a combination of accelerometers, gyroscopes, and sometimes magnetometers.
28. Fuel cell: A fuel cell is an electrochemical cell that converts the chemical energy of a fuel (often hydrogen) and an oxidizing agent (often oxygen) into electricity typically through a pair of redox reactions.
29. Field Replaceable Unit (FRU): A field-replaceable unit is a printed circuit board, part, or assembly that can be quickly and easily removed from a computer or other piece of electronic equipment, and replaced by the user or a technician without having to send the entire product or system to a repair facility.
30. Aerofoil: A structure with curved surfaces designed to give the most favorable ratio of lift to drag in flight, used as the basic form of the wings, fins, and horizontal stabilizer of most aircraft; an airfoil.
31. XTCE (for XML Telemetric and Command Exchange): It is an XML based data exchange format for spacecraft telemetry and command meta-data. Using XTCE the format and content of a space systems command and telemetry links can be readily exchanged between spacecraft operators and manufacturers. Extensible Markup Language (XML) is a markup language that defines a set of rules for encoding documents in a format that is both human-readable and machine-readable.

32. ML/AI: Machine learning (ML) is an application of Artificial Intelligence (AI) generating systems that can learn and improve without being programmed. Contrary to AI, ML concentrates on developing computer programs that access data and use it to learn for themselves. Artificial intelligence (AI), is intelligence demonstrated by machines, unlike the natural intelligence displayed by humans and animals.
33. Edge computing or edge compute: It is a distributed computing paradigm that brings computation and data storage closer to the location where it is needed, to improve response times and save bandwidth. Edge computing is a distributed, open IT architecture that features decentralised processing power, enabling mobile computing and Internet of Things (IoT) technologies.
34. Grid Interconnection: The power generating stations are interconnected for reducing the reserve generation capacity in each regional area.
35. A Flettner rotor: It is a smooth cylinder with disc end plates which is spun along its long axis and, as air passes at right angles across it, the Magnus effect causes an aerodynamic force to be generated in the direction perpendicular to both the long axis and the direction of airflow.
36. Hyperspectral imaging (HSI) or hyperspectral is a technique that analyzes a wide spectrum of light instead of just assigning primary colors (red, green, blue) to each pixel. The light striking each pixel is broken down into many different spectral bands in order to provide more information on what is imaged.
37. Scatterometer: A scatterometer or diffusionmeter is a scientific instrument to measure the return of a beam of light or radar waves scattered by diffusion in a medium such as air. Diffusionmeters using visible light are found in airports or along roads to measure horizontal visibility.
38. Interferometer: Interferometers are investigative tools used in many fields of science and engineering. They are called interferometers because they work by merging two or more sources of light to create an interference pattern, which can be measured and analyzed; hence 'Interfere-o-meter', or interferometer.
39. Bolometer: It is a sensitive electrical instrument for measuring radiant energy.
40. Radiometer: A radiometer or roentgenometer is a device for measuring the radiant flux of electromagnetic radiation.

Abbreviations and Acronyms

ATAK Android Team Awareness Kit
AUV Autonomous Underwater Vehicle
BLOS Beyond Line of Sight
BOM Bill of Material
C2 Command and Control
CONOPS Concept of Operations
CTD—Conductivity, Temperature and Depth
DOOS Deep Ocean Observing Strategy
EMI Electromagnetic Interference
EO/IR Electro-Optical/Infra-Red
EOV Essential Ocean Variables
EW Electronic Warfare
FOB Forward Operating Base
GNSS Global Navigation Satellite System
ISR Intelligence Surveillance Reconnaissance
IMU Inertial Measurement Unit
LIDAR Light Detection and Ranging
MANET Mobile Ad hoc Network
MBES Multi Phase Echo Sounder
MCM: Mine Counter Measures
MPES Multi Phase Echo Sounder
NOAA National Oceanic and Atmospheric Administration
OBIS Ocean Biogeographic Information System
PACE Persistent, Auxiliary, Contingent and Emergency.
RHIB Rigid Hull Inflatable Boat
ROV Remotely Operated Vehicle
SAS—Synthetic Aperture Sonar
SATCOM—Satellite Communication
SWAP+C Size, Weight and Power plus Cost
UAS Unmanned Aircraft System
USV Unmanned Surface Vehicle
UxV Unmanned Multi Domain Vehicle
UUV Unmanned Underwater Vehicle
VTOL Vertical Takeoff and Landing

We claim:

1. A network comprising a plurality of unmanned mobile communication stations adapted for location in a marine environment each said station comprising:
   a platform adapted for flotation or semi-submersible;
   a communication node for sending and receiving wireless signals;
   a power system for energizing said communication node;
   a data center;
   at least one sensor for detecting the geo location of said platform; and
   a processor for receiving signals from said sensors and controlling communication to and from said communication node;
   a propulsion system, for moving said station and maintaining the position of said station,
   wherein said plurality of stations form a mesh network comprising a plurality of nodes, said nodes comprising antennae adapted to receive satellite originated wireless transmissions from Geocentric, low earth orbit ("LEO") Medium Earth Orbit ("MEO") and geostationary (GEO) satellites, and in response to location data, said processor is configured to provide an output signal to a navigational system to change the position of said station and said navigation and propulsion systems further comprise an autonomous system, said navigation system comprising geolocation sensors and radar, and said navigation and propulsion systems allow for autonomous positioning of said station according to predetermined instructions, and said position of said stations comprises a grid array and wherein said instructions comprise signals to said navigation and propulsion system to maintain said stations in an array at predetermined distances apart from one another.

2. The mobile communication station recited in claim 1 further comprising a remote-controlled navigation and propulsion system, said navigation system comprises a geolocation sensor and camera, wherein said navigation and propulsion allow for the remote positioning of said station in response to remote wireless signals and data from said camera.

3. The mobile communication system recited in claim 1 further comprising a power harvesting system.

4. The mobile communication station recited in claim 3 wherein said power harvesting comprises a solar array.

5. The mobile communication system recited in claim 1, wherein said sensor further comprises at least one of the following: an acoustic sensor, a sonar, a LiDAR, a radar, a camera, wherein said sensor is in communication with said processor and said processor is adapted to transmit a signal containing data captured by said sensors to said autonomous navigation system wherein said autonomous navigation uses data from said sensors to avoid environmental obstacles.

6. The system of claim 1 further comprising underwater drone vehicles and a vehicle charging station.

7. The system of claim 1 wherein at least one ground station further comprises a tethered drone said drone configured to be extended into the air above the Fresnal Zone from said station to increase the range of surface communications.

8. The system of claim 7 wherein said drone operates using SATCOM frequencies and mesh networks including CSL and Link 16.

* * * * *